(12) United States Patent
Kiilerich Pratas et al.

(10) Patent No.: US 12,069,584 B2
(45) Date of Patent: Aug. 20, 2024

(54) POWER EXPOSURE REPORTING FOR WIRELESS NETWORKS

(71) Applicant: NOKIA TECHNOLOGIES OY, Espoo (FI)

(72) Inventors: Nuno Manuel Kiilerich Pratas, Gistrup (DK); Benny Vejlgaard, Gistrup (DK); Sari Kaarina Nielsen, Espoo (FI); Simon Svendsen, Aalborg (DK); Samantha Caporal Del Barrio, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 384 days.

(21) Appl. No.: 17/628,196

(22) PCT Filed: Jul. 18, 2019

(86) PCT No.: PCT/EP2019/069368
§ 371 (c)(1),
(2) Date: Jan. 18, 2022

(87) PCT Pub. No.: WO2021/008710
PCT Pub. Date: Jan. 21, 2021

(65) Prior Publication Data
US 2022/0256473 A1    Aug. 11, 2022

(51) Int. Cl.
*H04W 52/36* (2009.01)
*H04L 1/08* (2006.01)
(Continued)

(52) U.S. Cl.
CPC ............ *H04W 52/146* (2013.01); *H04L 1/08* (2013.01); *H04W 52/367* (2013.01); *H04W 74/085* (2013.01)

(58) Field of Classification Search
None
See application file for complete search history.

(56) References Cited

U.S. PATENT DOCUMENTS 8,781,437 B2   7/2014   Ngai et al.
9,426,754 B2   8/2016   Steer
(Continued)

FOREIGN PATENT DOCUMENTS

CN   104969087 A   10/2015
CN   108432296 A    8/2018
(Continued)

OTHER PUBLICATIONS

International Search Report and Written Opinion for International Application No. PCT/EP2019/069368, mailed Apr. 1, 2020, 10 pages.
(Continued)

*Primary Examiner* — Gary Lafontant
(74) *Attorney, Agent, or Firm* — Barta Jones, PLLC

(57) ABSTRACT

According to an example embodiment, a method may include detecting, by a user equipment in a wireless network, a power exposure event for the user equipment (e.g., a Maximum Permissible Exposure (MPE) event); and sending, by the user equipment to a base station, a message including at least a user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

20 Claims, 12 Drawing Sheets

(51) Int. Cl.
*H04W 52/14* (2009.01)
*H04W 74/0833* (2024.01)

(56) References Cited

U.S. PATENT DOCUMENTS

| | | | |
|---|---|---|---|
| 2012/0178494 | A1 | 7/2012 | Haim et al. |
| 2014/0370929 | A1 | 12/2014 | Khawand et al. |
| 2016/0066276 | A1 | 3/2016 | Su et al. |
| 2017/0331577 | A1 | 11/2017 | Parkvall et al. |
| 2017/0359114 | A1 | 12/2017 | Akkarakaran et al. |
| 2018/0167897 | A1 | 6/2018 | Sampath et al. |
| 2018/0278318 | A1 | 9/2018 | Chakraborty et al. |
| 2019/0029049 | A1 | 1/2019 | Akkarakaran et al. |
| 2022/0264481 | A1* | 8/2022 | Caporal Del Barrio ............... H04W 52/365 |

FOREIGN PATENT DOCUMENTS

| | | |
|---|---|---|
| CN | 109155976 A | 1/2019 |
| EP | 3462797 A | 4/2019 |
| WO | 2019126264 A1 | 6/2019 |
| WO | 2020/228934 A1 | 11/2020 |

OTHER PUBLICATIONS

3GPP TSG-RAN WG4 Meeting #90, R4-1900217; "Draft LS on Potential Beam Management Enhancement in Maximum Permissible Exposure Scenarios"; Athens, Greece; Feb. 25-Mar. 1, 2019; 1 page.
3GPP TSG-RAN WG4 Meeting #90, R4-1900252; "Required P-MPR/UL Dutycycle Restriction for MPE Regulations at FR2"; Athens, Greece; Feb. 25-Mar. 1, 2019; 5 pages.
3GPP TSG-RAN WG4 Meeting #90, R4-1900253; "Discussion on FR2 UE MPE Remaining Issues"; Athens, Greece; Feb. 25-Mar. 1, 2019; 4 pages.
3GPP RAN4 WG Meeting #90bis, R4-1903066; "Cross-WG Issues Related to the Development of Solutions to Mitigate Performance Under the MPE Scenario"; Xi'an, China; Apr. 8-12, 2019; 3 pages.
3GPP TSG RAN WG1 Meeting #96bis, R1-1905229; "On FR2 RF Exposure Mitigation Methods"; Xi'an, China; Apr. 8-12, 2019; 3 pages.
3GPP TSG-RAN WG4 Meeting #92, R4-1908820; "Mitigating Radio Link Failures due to MPE on FR2"; Ljubljana, Slovenia; Aug. 26-30, 2019; 5 pages.
3GPP TSG-RAN WG4 Meeting #92bis, R4-1911205; "Introducing NR intra-band CA for 3DL Bands and 1UL band for 38.101-1"; Chongqing, China, Oct. 13-18, 2019; 29 pages.
3GPP TSG-RAN WG4 Meeting #92bis, R4-1911526; "FR2 MPE Mitigation Solutions"; Chongqing, China, Oct. 10-18, 2019; 4 pages.

First Examination Report for India Application No. 202247007405, mailed on May 18, 2022, 6 pages.
Balanis, "Antenna Theory Analysis and Design", Wiley-Interscience, 3rd edition, 2005, 1072 pages.
Wu et al.,"Safe for Generations to Come: Considerations of Safety for Millimeter Waves in Wireless Communications", IEEE Microwave Magazine, vol. 16, No. 2, Feb. 6, 2015, pp. 65-84.
Alekseev et al., "Millimeter wave power density in aquaeous biological samples", Bioelectromagnetics, vol. 22, No. 4, Apr. 5, 2001, pp. 288-291.
"Radiofrequency radiation exposure evaluation: portable devices", eCFR, Retrieved on Feb. 14, 2024, Webpage available at : https://www.ecfr.gov/current/title-47/chapter-I/subchapter-A/part-2/subpart-J/subject-group-ECFR52efa600149ef42/section-2.1093.
Wu et al., "The Human Body and Millimiter-Wave Wireless Communication Systems: Interactions and Implications", IEEE International Conference on Communications (ICC), Jun. 8-12, 2015, pp. 2423-2429.
"3rd Generation Partnership Project; Technical Specification Group Radio Access Network; NR; User Equipment (UE) radio transmission and reception; Part 2: Range 2 Standalone (Release 15)", 3GPP TS 38.101-2, V15.5.0, Mar. 2019, pp. 1-142.
"Draft CR to TS38.101-2 on FR2 UE maxUplinkDutyCycle", 3GPP TSG-RAN WG4 Meeting #91, R4-1907473, Nokia, May 13-17, 2019, 2 pages.
"[Draft] LS on FR2 maxUplinkdutycycle", 3GPP TSG-RAN WG4 Meeting #91, R4-1907458, RAN4, May 13-17, 2019, 2 pages.
"3rd Generation Partnership Project, Technical Specification Group Radio Access Network; NR; Physical channels and modulation (Release 15)", 3GPP TS 38.211, V15.5.0, Mar. 2019, pp. 1-96.
"3rd Generation Partnership Project; Technical Specification Group Radio Access Network; NR; NR and NG-RAN Overall Description; Stage 2 (Release 16)", 3GPP TS 38.300, V16.7.0, Sep. 2021, pp. 1-152.
"3rd Generation Partnership Project; Technical Specification Group Radio Access Network; NR; Medium Access Control (MAC) protocol specification (Release 16)", 3GPP TS 38.321, V16.6.0, Sep. 2021, pp. 1-158.
"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.
Office Action received for corresponding Chinese Patent Application No. 201980098552.1, dated Jan. 11, 2024, 8 pages of Office Action and no page of translation available.
"Enhancements on Multi-beam Operation", 3GPP TSG RAN WG1 #97 Meeting, R1-1907317, Agenda item: 7.2.8.3, Nokia, May 13-17, 2019, 22 pages.

* cited by examiner

POWER EXPOSURE REPORTING FOR WIRELESS NETWORKS

CROSS-REFERENCE TO RELATED APPLICATIONS

This application is a national stage entry of International Application No. PCT/EP2019/069368, filed Jul. 18, 2019, entitled "POWER EXPOSURE REPORTING FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include detecting, by a user equipment in a wireless network, a power exposure event for the user equipment; and, sending, by the user equipment to a base station, a message including at least a user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

According to an example embodiment, an apparatus may include means for detecting, by a user equipment in a wireless network, a power exposure event for the user equipment; and, means for sending, by the user equipment to a base station, a message including at least a user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

According to an example embodiment, an apparatus may include: at least one processor; and at least one memory including computer program code; the at least one memory and the computer program code configured to, with the at least one processor, cause the apparatus at least to: detect, by a user equipment in a wireless network, a power exposure event for the user equipment; and, send, by the user equipment to a base station, a message including at least a user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

According to an example embodiment, a non-transitory computer-readable storage medium comprising instructions stored thereon that, when executed by at least one processor, are configured to cause a computing system to perform a method of: detecting, by a user equipment in a wireless network, a power exposure event for the user equipment; and, sending, by the user equipment to a base station, a message including at least a user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

According to an example embodiment, a method may include: receiving, by a base station from a user equipment, a message including at least a user equipment identifier identifying a user equipment, information indicating that a detected power exposure event for the user equipment is a trigger for the message, and information identifying at least one of: a reduced maximum output power value for the user equipment and/or a reduced maximum uplink duty cycle for the user equipment, based on the detected power exposure event; and sending, by the base station to the user equipment, an acknowledgement that acknowledges receipt by the base station of the message.

According to an example embodiment, an apparatus may include means for receiving, by a base station from a user equipment, a message including at least a user equipment identifier identifying a user equipment, information indicating that a detected power exposure event for the user equipment is a trigger for the message, and information identifying at least one of: a reduced maximum output power value for the user equipment and/or a reduced maximum uplink duty cycle for the user equipment, based on the detected power exposure event; and means for sending, by the base station to the user equipment, an acknowledgement that acknowledges receipt by the base station of the message.

According to an example embodiment, an apparatus may include: at least one processor; and at least one memory including computer program code; the at least one memory and the computer program code configured to, with the at least one processor, cause the apparatus at least to: receive, by a base station from a user equipment, a message including at least a user equipment identifier identifying a user equipment, information indicating that a detected power exposure event for the user equipment is a trigger for the message, and information identifying at least one of: a reduced maximum output power value for the user equipment and/or a reduced maximum uplink duty cycle for the user equipment, based on the detected power exposure event; and send, by the base station to the user equipment, an acknowledgement that acknowledges receipt by the base station of the message.

According to an example embodiment, a non-transitory computer-readable storage medium comprising instructions stored thereon that, when executed by at least one processor, are configured to cause a computing system to perform a method of: receiving, by a base station from a user equipment, a message including at least a user equipment identifier identifying a user equipment, information indicating that a detected power exposure event for the user equipment is a trigger for the message, and information identifying at least one of: a reduced maximum output power value for the user equipment and/or a reduced maximum uplink duty cycle for the user equipment, based on the detected power exposure event; and sending, by the base station to the user equipment, an acknowledgement that acknowledges receipt by the base station of the message.

The details of one or more examples of embodiments are set forth in the accompanying drawings and the description below. Other features will be apparent from the description and drawings, and from the claims.

DETAILED DESCRIPTION

Figure 1:
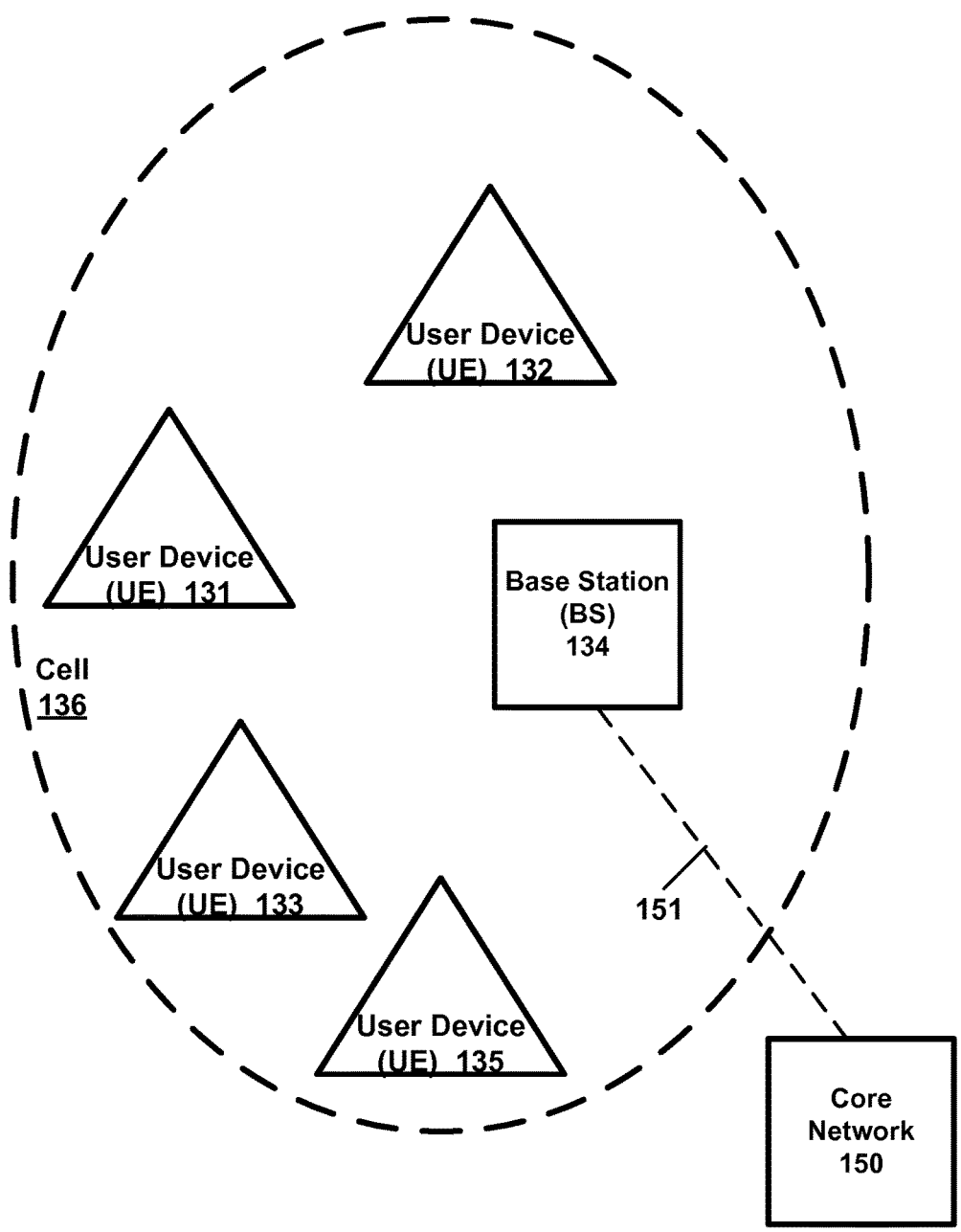
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

As the number of online services dramatically increases every year, the thirst for bandwidth is insatiable. The millimeter-wave (mmWave) spectrum, as an illustrative example, offers the possibility of using large portions of contiguous bandwidth to address high-throughput applications. Hence, the 5th Generation (5G) New Radio (NR) frequency spectrum, as an example, may extend well-above the previous 4th Generation (4G) frequency spectrum, which ranges from 400 MHz to 6 GHz—otherwise known as Frequency Range 1 (FR1). In mmWave 5G NR, Frequency Range 2 (FR2), may include the frequencies between 24 GHz and 52 GHz; and extending the NR operation into the 52-114 GHz range is currently being discussed.

However, operating at such high frequencies with high gain antennas has raised concerns for the health of the users. Therefore, standards may exist for mmWave (or other high frequencies) that specify and regulate the maximum power for the User Equipment (UE). Since frequencies below 100 GHz are non-ionizing, the concern for health may, at least in some cases, be limited to thermal heating of the body tissue while absorbing electromagnetic mmWave energy. For example, in some cases, mmWave frequencies may yield penetration depths below 1 mm, therefore possible thermal damage may be limited to the surface of the skin and the eyes. Most of the energy is absorbed within the first 0.4 mm of the human skin at 42 GHz, for example.

Governmental exposure guidelines are in place to prevent health issues due to thermal effects. Below 6 GHz, Specific Absorption Rate (SAR) has been used to determine the exposure threshold. SAR measures the energy absorbed by the human body when exposed to electromagnetic fields. For example, a SAR limitation in the U.S. is 1.6 W/kg (watts per kilogram) averaged over 1-g (one gram of) tissue from FCC (Federal Communications Commission), while in Europe it is 2 W/kg averaged over 10-g tissue. The 1-g averaging provides a finer resolution for the study of energy absorption in the human body.

Nonetheless, for example, at mmWave type frequencies where the penetration depth may be below 1 mm, even 1-g tissue is in fact a rather large volume. Being difficult to define a meaningful volume for SAR evaluation, it has been commonly accepted to use Power Density (PD) and not SAR to set the restrictions on exposure at mmWave frequencies. Thus, it may be a planar energy distribution as opposed to a volumetric energy distribution. The Maximum Permissible Exposure (MPE) is a regulation on PD (power density) for the mmWave frequencies, for example. As an illustrative example, the Federal Communications Commission (FCC) and/or the International Commission on Non-Ionizing Radiation Protection (ICNIRP) may set a threshold(s) or limit(s) for MPE, such as, for example, at 10 W/m² (1 mW/cm²), for the general public, e.g., between 6 or 10 GHz respectively and 100 GHz. The energy absorbed by the human body increases as a function of the distance to the UE. Thus, according to an example embodiment, electronic devices and/or systems (e.g., UEs and/or in cooperation with BSs) should take steps so as not to violate or exceed these MPE limits. Therefore, in order to comply with the MPE limit, the UE may have to reduce its output power if the user comes in close vicinity of the antenna of the UE.

According to an example embodiment, a UE may detect a power exposure event. An example of a power exposure event may include a MPE event. According to an example embodiment, a power exposure event may refer to a UE exceeding or not complying with a power exposure requirement (e.g., for example, a UE exceeding a MPE limit). Alternatively, a power exposure (e.g., MPE) event may include where one or more parameters or transmission conditions indicate a significant risk or even likelihood of a power exposure violation (e.g., one or more parameters or conditions indicating a risk that a UE may or will likely exceed a MPE limit). For example, a UE may detect a power exposure event, such as, for example, based on a MPE violation or a likely MPE violation or significant risk of MPE violation, e.g., if no UE corrective actions are performed. Thus, as an illustrative example, a UE may detect a power exposure (e.g., MPE) event based on a UE transmission power exceeding a threshold for a specific minimum period of time, and/or a distance between the UE and user being less than a threshold, or based on other parameter or UE transmission condition. According to an example embodiment, the detection of a power exposure event may cause or may require the UE to perform one or more actions to avoid exceeding the power exposure (e.g., MPE) limit, or otherwise to address or reduce the power exposure event (e.g., reduce power exposure to the user).

A UE may detect a power exposure event based on a variety of factors or parameters or transmission conditions, e.g., such as a UE output power over a period of time, a UE maximum output power, a UE uplink duty cycle (and/or a maximum UE UL duty cycle), a beam (e.g., beam direction and/or beam width of an uplink transmission beam) used for UE uplink transmission, a relative location of a user with respect to the UE (which may take into account the uplink transmission beam, and whether a UE is within (or overlaps with) a path of the transmission beam or uplink transmission), whether the user is in the beam direction or beam path from UE to BS for uplink transmission, a distance from UE to user, etc., or any other parameter that may affect the radiation pattern of a signal transmitted by the UE. For example, a UE may include a proximity sensor (e.g., which may be implemented as a radar, thermal sensor or other proximity detection device) to determine when a UE-user distance is less than a threshold distance, or otherwise, to determine a UE-user distance.

As an illustrative example, a UE may detect a power exposure event based on a distance between a UE and user (which may be referred to as the UE-user distance). For example, no power exposure event exists (or is detected by the UE) when the UE-user distance is greater than or equal to a threshold. Likewise, a power exposure exists (or is detected by a UE) for a UE when the UE-user distance is less than the threshold. In a slightly more complicated version of the power exposure event detection, a power exposure event may occur when the UE-user distance is less than a threshold, and the UL transmission beam (or UL transmission direction) of the UE overlaps with the UE. These are merely some illustrative examples, and other conditions or parameters may be used to detect a power exposure (e.g., MPE) event, e.g., which may cause or require the UE and/or BS to then take corrective action to address or reduce the exposure to the UE.

Figure 2:
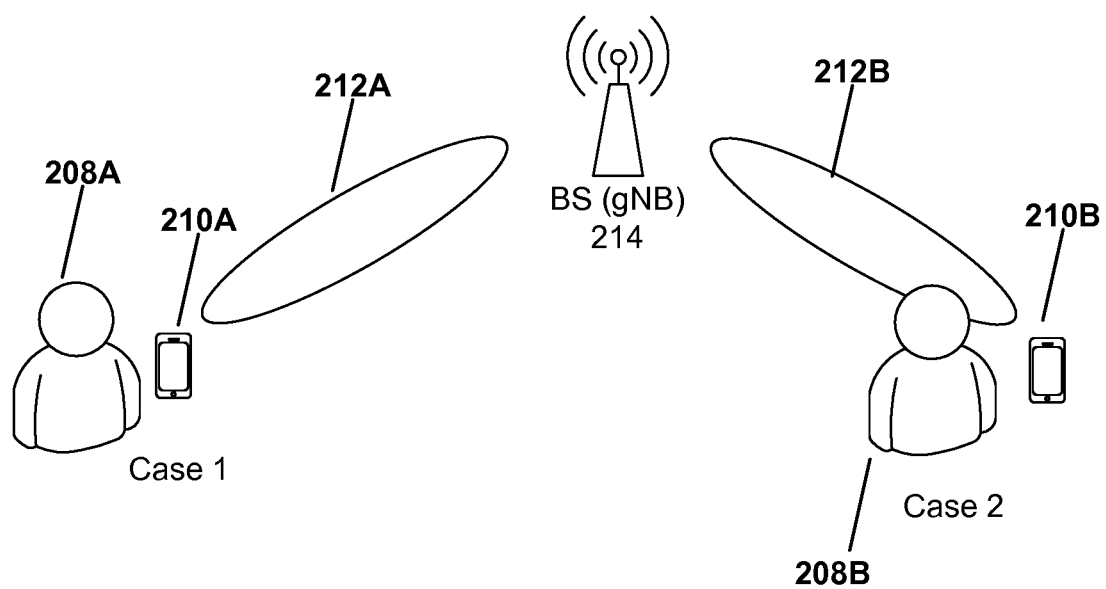
FIG. 2 is a diagram illustrating two uplink transmission scenarios.

FIG. 2 is a diagram illustrating two uplink transmission scenarios. In case 1, a user 208A of a UE 210A transmits a signal uplink via beam 212A to BS 214, where there is an unobstructed (Line of Sight) LOS path from the UE 210A to the BS 214 (e.g., beam 212A does not overlap with the user 208A). Thus, in case 1, considering the direction of transmission (e.g., based on beam 212A), there may be no detected power exposure event, in this illustrative example. In case 2, a user 208B of a UE 210B transmits a signal uplink via beam 212B to BS 214, where there is an obstructed (Line of Sight) LOS path from the UE 210B to the BS 214 (e.g., the beam 212B, or direction of transmission, overlaps with the user 208B). Thus, case 2 may indicate or cause a power exposure event, for example. Thus, for example, in case 2, the human body of the user 208B is located within the path of the beam 212B from the UE 210B to BS 214. For example, in case 1, the UE output power or Effective Isotropic Radiated Power (EIRP) peaks at +34 dBm. While in case 2, the user is exposed to the radiated beam. As the user comes in close vicinity of the UE (within a threshold distance), the amount of energy absorbed by the user's body increases. Thus, for example, case 2 may be considered an example of a power exposure (e.g., MPE) event, and the output power of the UE may be reduced to comply with the MPE restriction, for example (or other corrective action taken to reduce the exposure to the user).

Figure 3:
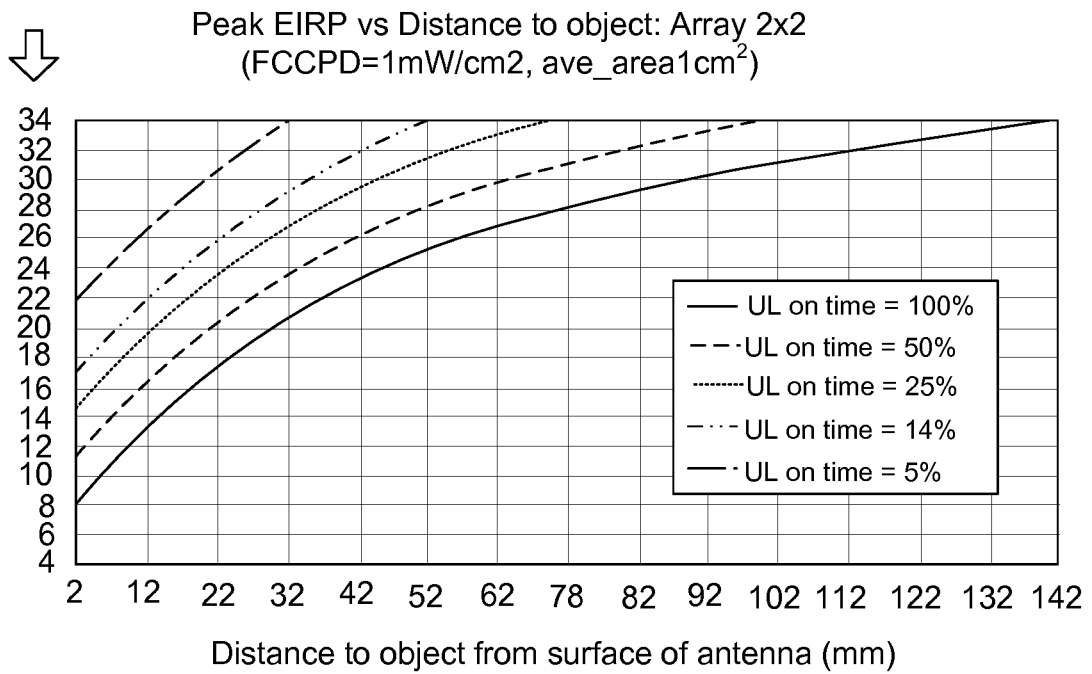
FIG. 3 is a diagram illustrating peak (or maximum) UE output power (e.g., peak EIRP) based on UE-user distance and uplink duty cycle of the UE according to an illustrative example.

FIG. 3 is a diagram illustrating peak (or maximum) UE output power (e.g., peak EIRP) based on UE-user distance and uplink duty cycle of the UE according to an illustrative example. For example, FIG. 3 shows what is the allowed maximum EIRP depending on the distance between the UE and the user as well as the applied duty cycle in the uplink signal. The reduction in allowed peak EIRP is up to 26 dBm for a 2×2 antenna array (when observing that the peak EIRP at 142 mm and the 2 mm from the user is 34 dBm and 8 dBm respectively). Thus, as some 5G NR bands operate at very high frequencies, it requires high gain antennas to maintain a good signal. However, as high gain antennas direct significant energy that may come towards the user, whom the FCC protects by setting an MPE threshold (or MPE restriction/limit). The UE should (or in some cases must) comply with MPE restriction, and subsequently reduce its output power if the user comes in close vicinity of the UE, for example. However, a problem may arise where reducing too much of the output power of the UE may lead to loss of the connection between the UE and BS, also known as a Radio Link Failure (RLF). Thus, it may be desirable to provide techniques to allow a communication system (e.g., UE and/or BS) to address and/or reduce UE exposure due to a power exposure (e.g., MPE) event, while allowing the UE and/or BS to take steps to maintain the connection between the UE and BS.

Figure 4:
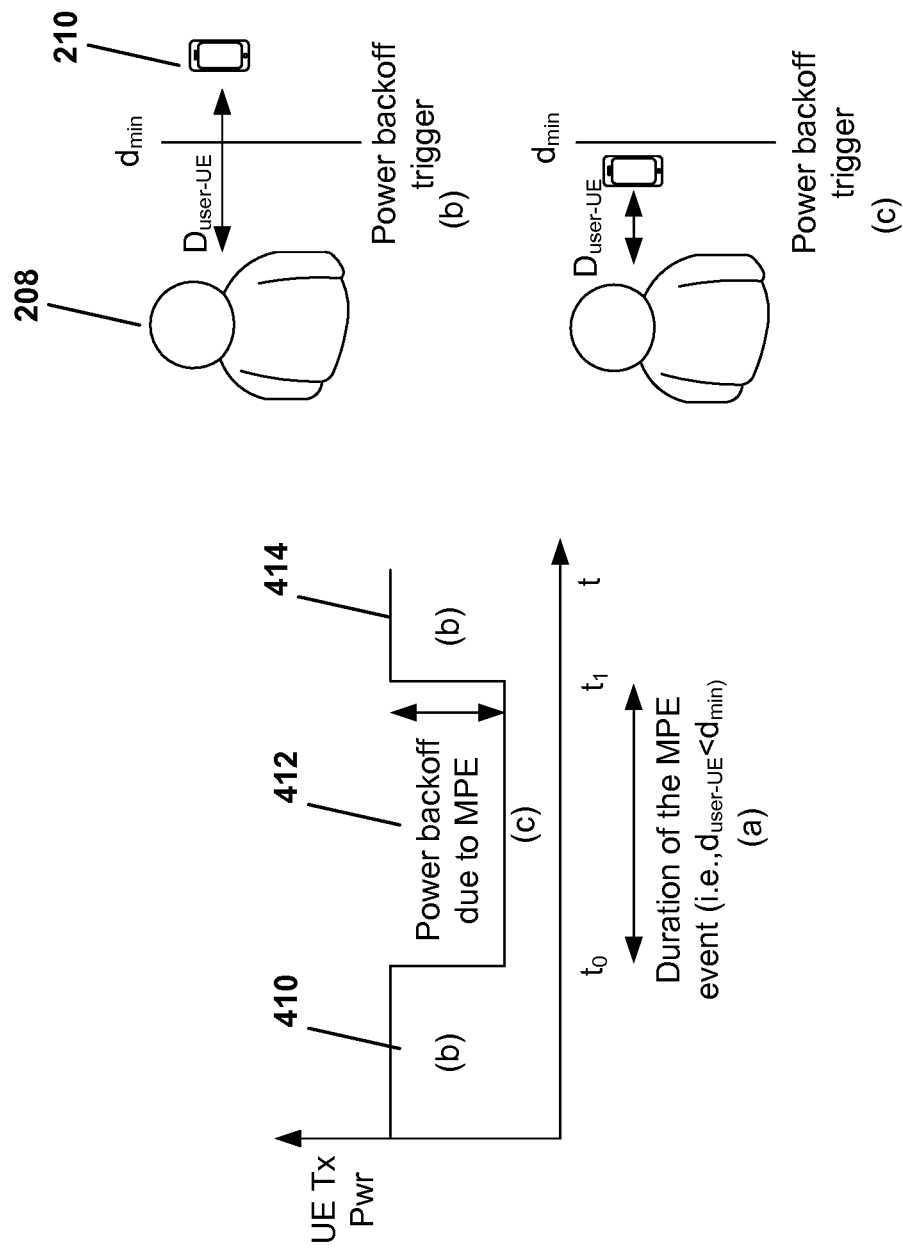
FIG. 4 is a diagram illustrating a power exposure event according to an example embodiment.

FIG. 4 is a diagram illustrating a power exposure event according to an example embodiment. As shown in FIG. 4, a user 208 may be using a UE 210. UE 210 may include a proximity sensor, which may detect when the user is within a threshold distance ($d_{min}$) of the UE. Thus, in this illustrative example, a power exposure event (e.g., MPE event) may occur when the distance between the user and UE ($D_{user-UE}$) is less than the threshold distance (less than $d_{min}$.). Thus, at 410, the UE maximum output power is at an initial level. At $t_0$, the proximity sensor of the UE detects that the distance between the user and UE ($D_{user-UE}$) is less than the threshold distance (less than $d_{min}$), thus, indicating a power exposure event. This may cause the UE 210 to perform one or more actions to reduce user exposure, e.g., such as by reducing a maximum output power of the UE, which may be referred to as a UE power backoff/reduction (or a UE maximum power backoff) of the UE, which is performed at 412. Later, at $t_1$, the proximity sensor on the UE detects that the distance between the user and UE ($D_{user-UE}$) is greater than the threshold distance (less than $d_{min}$), thus, indicating the end of the power exposure event. Thus, at 414 (beginning at $t_1$), the UE increases its maximum output power to its initial or original level (ending the power backoff/reduction of the UE).

As shown in FIG. 4, at (b), the distance between the user and UE ($D_{user-UE}$) is greater than the threshold distance (greater than $d_{min}$); while at (c), the distance between the user and UE ($D_{user-UE}$) is less than the threshold distance (less than $d_{min}$), e.g., indicating an example triggering of a power exposure (e.g., MPE) event, according to this illustrative example. Duration of the power exposure (e.g., MPE) event is shown as (a), which corresponds to 412, which is the time from $t_0$ to $t_1$.

According to an example embodiment, the network (including the BS) may typically be unaware of when this power exposure (or MPE) event occurs for the UE, and the BS may typically be unaware of when the UE performs the resulting reduction in maximum power output (or UE power backoff) to address or respond to the power exposure event. Thus, for example, at least in some cases, as a result of the reduction in maximum UE output power (e.g., at 412 in FIG. 4), which is not expected by the BS, the BS may, at least in some cases, be unable to receive a signal from the UE, e.g., because such signal may not have been transmitted with a sufficient power from the UE's uplink transmission in order for the BS to decode successfully the UE's transmitted payload. This may occur, e.g., because the link adaptation (e.g., the selection of modulation and coding scheme (MCS), transport block size (TBS) and/or uplink (UL) transmission power) was performed by the BS when there was no power exposure event (and, e.g., thus, when the UE had no such reduction in maximum UE output power). Depending on the duration of the MPE event, a radio link failure (RLF) may also be triggered, which besides disrupting the user experience, will also require the UE to reconnect to the BS/network (i.e., transition again to radio resource control (RRC) Connected state), causing significant service delay and/or connection interruption.

As a result, according to an example embodiment, there may be a need for (i) a signalling procedure that allows the serving BS to be informed of whenever a power exposure (e.g., MPE) event occurs at a UE; and (ii) a mechanism that allows the serving BS to cope with a likely decrease in UL transmission power from the UE (to allow the BS to perform one or more actions that may at least partially compensate for a reduced maximum UE output power and/or a reduced maximum UL duty cycle of the UE). According to an example embodiment, an UL duty cycle of the UE may include a percentage (or portion) of slots that are available to a UE for UL transmission (e.g., a percentage of slots for which UL resources have been allocated to the UE for UL transmission to the BS).

According to an example embodiment, power exposure to a user may be measured over a period of time, e.g., over 10 ms, or other time period. Thus, both the UE output power and/or the UE UL duty cycle (or amount of time, or percentage of subframes, that the UE is actually performing UL transmission) will impact the power exposure to the user over such period of time. Thus, according to an example embodiment, a UE may address or respond to a detected power exposure (e.g., MPE) event by, e.g., reducing a maximum UE output power and/or reducing a maximum UE uplink (UL) duty cycle (or both).

Therefore, according to an example embodiment, a signalling mechanism may be provided to allow the UE to indicate to the BS when a power exposure event (e.g., MPE event) has occurred at the UE (e.g., MPE event has been detected by the UE), and to indicate to the BS one or more parameters or details (e.g., MPE state) associated with the power exposure event. For example, a UE may detect a power exposure event (e.g., MPE event) and then send a message to the BS to indicate the occurrence of the power exposure event at the UE, and to indicate one or more actions (e.g., a reduction in a UE maximum output power, and/or a reduction in a UE maximum UL duty cycle) that have been performed by the UE in response to the UE detecting the power exposure (e.g., MPE) event.

Based on the received message, the BS may then perform one or more actions (e.g., increasing a receive beamforming gain at the BS for receiving UL signals from the UE and/or allocating additional receive antenna elements at the BS) in attempt to at least partially compensate for the decreased UE output power and/or reduced UE UL duty cycle. Also, the BS may allocate or assign resources to the UE for UL transmission that do not exceed the indicated maximum UE UL duty cycle. Also, if the UE does not indicate a maximum UL duty cycle in the message, the BS may determine a maximum UL duty cycle for the UE, e.g., based on the indicated reduced maximum output power of the UE, and then may assign UL resources to the UE for UL transmission that do not (or assign resources to the UE in a manner that the UE UL transmissions will not) exceed this determined maximum UL duty cycle of the UE.

Thus, an example embodiment may include: detecting, by a UE in a wireless network, a power exposure event for the UE; and, sending, by the UE to a BS (e.g. the serving BS), a message including at least a UE identifier identifying (e.g., a cell-radio network temporary identifier (C-RNTI) assigned to the UE or other UE identifier) the UE, information indicating that the detected power exposure event for the UE is a trigger (or cause) for the sending of the message, and information identifying at least one of: a reduced maximum output power value for the UE and/or a reduced maximum uplink (UL) duty cycle for the UE, based on the detected power exposure event. The BS (e.g., the serving BS that is serving the UE) may receive the message, and then send an acknowledgement that acknowledges receipt by the BS of the message.

According to an example embodiment, the reduced maximum output power value may include, e.g., at least one of: an absolute value that indicates a maximum output power for the user equipment; or a relative value that indicates an amount that the user equipment will reduce its maximum output power (e.g., UE maximum power backoff, that indicates an amount of UE maximum power backoff/reduction). For example, the absolute value that indicates a maximum output power for the user equipment may include a maximum effective isotropic radiated power (EIRP) value for the UE, or a maximum output power from an amplifier of the UE that is input to an antenna array of the UE, etc. Also, for example, the UE maximum power backoff may be indicated as a peak/maximum EIRP backoff value, for example (e.g., where backoff in this context may refer to a decrease in a maximum output power of the UE).

According to an example embodiment, a UE may include a proximity sensor to detect that a user is close to (or in proximity to), e.g., within a threshold distance of, the UE. According to an example embodiment, the detecting a power exposure event may include detecting, based on a proximity sensor of the UE, that a distance between the UE and an object or user of the UE is less than a threshold. This situation may be an example of a power exposure (e.g., MPE) event.

The UE may perform further steps or actions, such as performing one or more of the following, e.g., in response to detecting the power exposure event: decreasing, by the UE, a maximum (or peak) output power of the UE based on at least one of the power exposure event or the reduced maximum uplink duty cycle for the UE; and/or decreasing, by the UE, an uplink duty cycle of the UE based on at least one of the power exposure event or the reduced maximum output power value for the UE. For example, the UE may maintain an UL duty cycle, and then decrease a maximum output power of the UE; may maintain (or not reduce) its current maximum UE output power and then reduce the maximum UE UL duty cycle; or may adjust or reduce both the maximum UL duty cycle and the maximum UE output power, as a way for the UE to address or respond to the detected power exposure event (e.g., as a way to decrease power exposure to the UE).

Figure 5A:
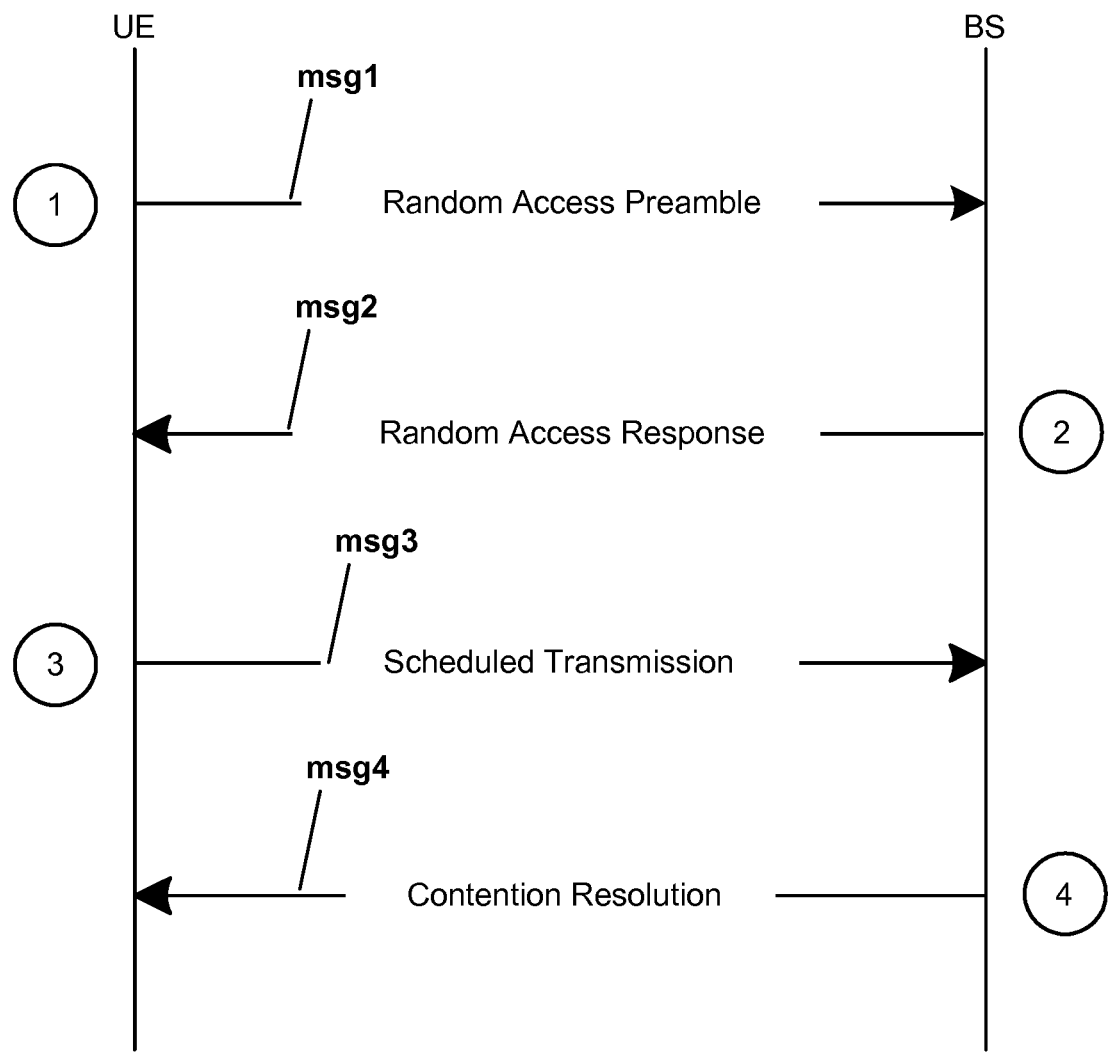
FIG. 5A is a diagram illustrating operations of a 4-step random access (RACH) procedure according to an example embodiment.

FIG. 5A is a diagram illustrating operations of a 4-step random access (RACH) procedure according to an example embodiment. When the RACH procedure is triggered (caused to be performed by the UE), the UE sends a random access preamble over the random access channel (RACH) (Step 1), or msg1 (message 1). There are different groups of preambles defined, depending on the size of msg3 (message 3) and based on the UE's channel conditions. The UE obtains information on how to access the channel from system information block 1 (SIB1) broadcasted in the BS system information (SI). In Step 2 (msg2 or message 2), the network (BS), upon reception of a preamble (if there are no collisions with other UEs), responds with a random access response (RAR). The UE must monitor the physical downlink control channel (PDCCH) channel identified by an RA-RNTI (random access-radio network temporary identifier assigned to the UE) during a window that starts at the subframe containing the end of the preamble transmission. Upon receiving the RAR message, the UE can send the first uplink transmission to the network (msg3 or message 3). The size of the transmission of msg3 depends on the grant received at step 2 (msg2 or message 2). Step 4 (msg 4 or message 4) involves the contention resolution phase.

Figure 5B:
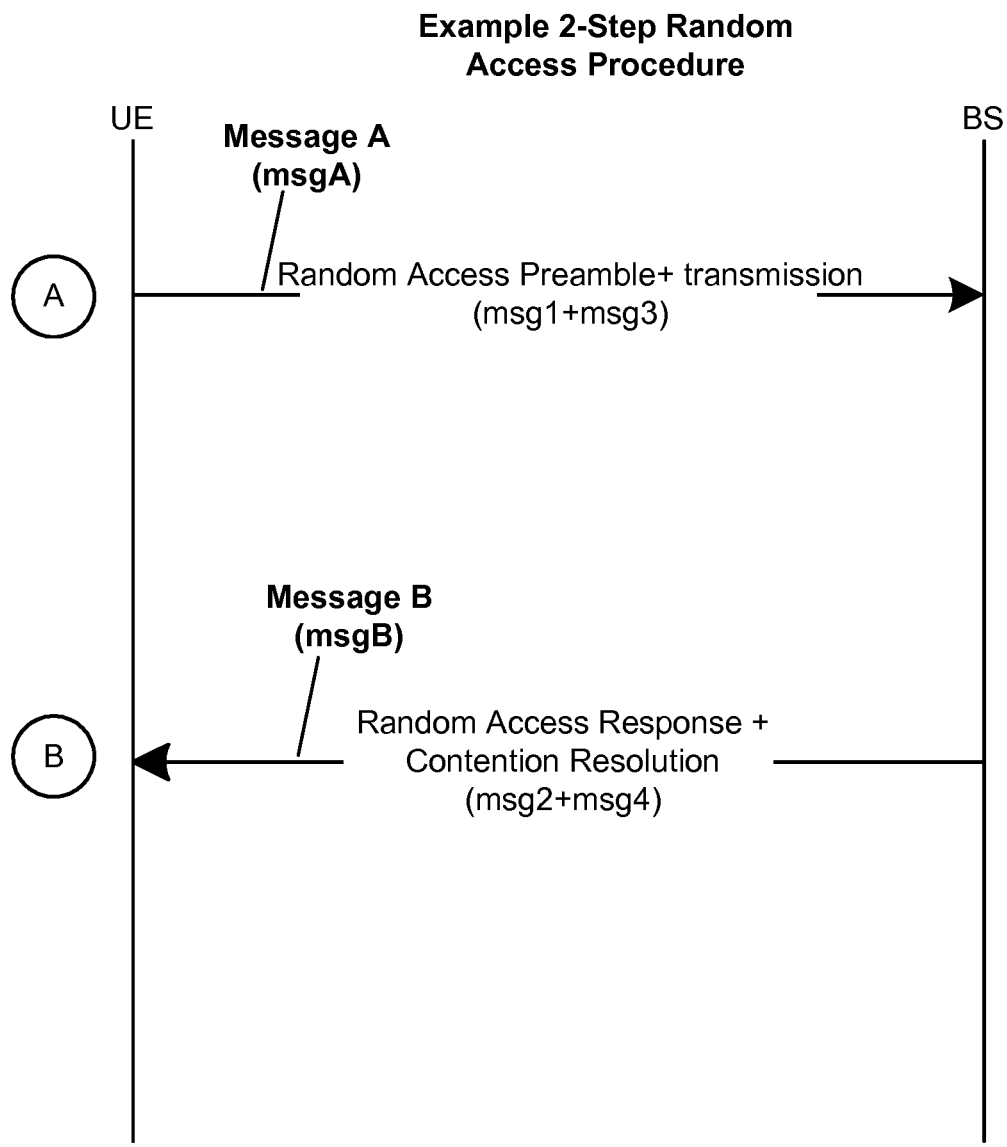
FIG. 5B is a diagram illustrating operations of a 2-step random access (RACH) procedure according to an example embodiment.

Furthermore, as an alternative RACH procedure, a 2-step RACH (random access) procedure may be used to provide a faster random access procedure. FIG. 5B is a diagram illustrating operations of a 2-step random access (RACH) procedure according to an example embodiment. At message A (msgA), a UE may transmit msg3 (or a message that include contents of both msg1 and msg3) as a first message (msgA) of the 2-step RACH procedure. And, for example, the BS or gNB may transmit msg2 and msg4 as a second message (or msgB or message B) of the 2-step RACH procedure.

According to an example embodiment, the message (e.g., indicating that a detected power exposure event triggered the sending of the message, and indicating at least one of a reduced maximum output power of the UE and/or a reduced maximum UL duty cycle of the UE) may be transmitted by the UE as a random access procedure (RACH) message. For example, the message may be sent as a message A (msgA) (or a first message sent by the UE to a BS) of a 2-step RACH procedure. Or, the message may be sent, e.g., as a combination of msg1 (the first message) and msg3 (the third message) transmitted by the UE to the BS of a 4-step RACH procedure. MsgA of the 2-step RACH procedure may combine or include the information of both msg1 and msg3 of the 4-step RACH procedure, for example.

Thus, the message (e.g., which may indicate that a detected power exposure event triggered the sending of the message, and indicating at least one of a reduced maximum output power of the UE and/or a reduced maximum UL duty cycle of the UE) may include a random access (RACH) preamble and a payload that includes at least the UE identifier (e.g., C-RNTI or other UE identifier) identifying the UE, information indicating that the detected power exposure event for the user equipment is a trigger (or cause) for the sending of the message, and information identifying at least one of: a reduced maximum output power value for the user equipment and/or a reduced maximum uplink duty cycle for the user equipment, based on the detected power exposure event. This message payload may be sent, e.g., as either a media access control (MAC) control element (MAC CE), or layer 2/L2 message. This information may be sent within one message, such as a msgA (or first message) of a 2-step RACH procedure. Alternatively, this information may be sent via multiple (e.g., two) RACH messages of a 4-step RACH procedure, including: the RACH preamble sent via msg1 (or a first message) of a 4-step RACH procedure, and the payload being sent via a msg3 (or third message of the 4-step RACH procedure. For example, as noted the payload may include, e.g., the UE identifier, information indicating that the detected power exposure event for the user equipment is a trigger for the message, and information identifying at least one of: a reduced maximum output power value for the UE and/or a reduced maximum uplink duty cycle for the UE.

Thus, according to an example embodiment, the MPE event (or power exposure event) may be reported (e.g., along with an MPE state of the UE) by a UE to a BS via a RACH procedure message (e.g., either 2-step RACH procedure message or a 4-step RACH procedure message). However, the RACH procedure may be adapted or changed to accommodate a MPE event reporting. For example, the MPE event may be reported by a UE via (i) transmission of PRACH (RACH preamble) and PUSCH (payload) that are transmitted via user equipment (UE) full maximum output power that is greater than the reduced maximum output power of the UE (e.g., the UE reduced maximum output power may be determined by the UE to decrease power exposure to a user from the UE in response to detecting the power exposure (e.g., MPE) event); and (ii) RACH backoff (or time delay between RACH message transmissions/retransmissions based on UE UL duty cycle) based on the reduced UE maximum UL duty cycle. Thus, for example, UE may send a RACH message to report power exposure event at a maximum UE output power (to increase probability the message will be received by the BS), and each retransmission of such RACH message (e.g., until an acknowledgement is received by UE) may also be transmitted/retransmitted at a full maximum output power of the UE. However, each retransmission of the RACH message to report power exposure event/MPE event may be spaced in time (e.g., using a backoff in time) based on the reduced UL duty cycle of the UE (e.g., spaced in time to comply with the reduced maximum UL duty cycle of the UE).

With respect to (i), the RACH message may be a 2-step or 4-step RACH message, and does not follow the traditional power ramping scheme (e.g., where a first RACH message transmission is transmitted at a lower output power, and each successive retransmission is performed at a higher output power). Instead, for example the UE transmits the PRACH (and PUSCH), and each retransmission thereof, with a full UE maximum output power that is greater than the reduced maximum output power.

With respect to (ii), the UE may alter its RACH backoff (backoff in time, or delay between retransmissions) procedure in order to meet the MPE power restrictions. For example, if the maximum UL duty cycle of the UE (DC restriction) is 5% and the UE takes 1 ms to perform the PRACH and PUSCH transmissions, then the next PRACH+PUSCH retransmission (taking as an example the 2-step RACH) would have to occur (at least) 20 ms later, e.g., in order to comply with (not violate) the UE reduced maximum UL duty cycle. In another embodiment, the UE could perform the several needed RACH retransmissions with full UE maximum output power continuous in time, but then the UE would have to stop its UL transmissions for a sufficient amount of time until it meets the DC (duty cycle) constraint (e.g., so that the UL transmissions comply with or do not exceed the reduced maximum UL duty cycle of the UE, which was triggered in response to detection of the power exposure event).

Thus, according to an example embodiment, the UE sending the message may include, e.g., sending, by the user equipment (UE) using a full maximum output power of the UE that is greater than the reduced maximum output power, a random access procedure (RACH) message including information indicating that the detected power exposure event for the user equipment is a trigger for the sending of the random access procedure (RACH) message, and information identifying at least one of: a reduced maximum output power value for the user equipment and/or a reduced maximum uplink duty cycle for the user equipment, based on the detected power exposure event.

Also, for example, the method may further include performing, by the UE, one or more retransmissions of the random access procedure (RACH) message using the full maximum output power of the user equipment if an acknowledgement to the random access procedure (RACH) message is not received by the user equipment, wherein the performing the one or more retransmissions of the random access procedure (RACH) message being performed at a time or with a time backoff that is in accordance with the reduced maximum uplink duty cycle for the user equipment.

For example, if the reduced maximum UL duty cycle for the UE is restricted to 5%, then the UE can only transmit during 1 ms out of 20 ms. Furthermore, it should be mentioned that when the UE has to perform RACH retransmissions, then the actual backoff mechanism also follows the UE UL duty cycle (DC) restrictions (maximum UE UL duty cycle). Thus, applying the UE UL duty cycle restrictions may indicate or dictate a (e.g., minimum) periodicity between RACH retransmissions, e.g., 20 ms in the example noted above for a 5% maximum UL duty cycle for the UE. For example, in an extreme case the reduced maximum UL DC of the UE may be restricted (or limited) to 1%, then the UE could only transmit during 1 ms out of 100 ms. Also, for example if the maximum UL duty cycle (DC) is restricted to 5%, and the UE has to perform 4 retransmissions of the RACH each with 1 ms, then the UE may perform UL transmissions for 4 ms and then will need to wait for 80 ms before performing an UL transmission again (e.g., for the UE to avoid exceeding the reduced maximum UL duty cycle of the UE), as an illustrative example.

According to an example embodiment, a power exposure event (e.g., MPE) restriction may restrict or limit the amount of UE maximum output power and or maximum period of transmission time (or amount of data that may be transmitted) that a UE may be able to transmit, while still complying with the power exposure (e.g., MPE) event restriction or MPE limit. Thus, at least in some cases, after detecting a power exposure (e.g., MPE) event, the UE may, for example, adjust (e.g., reduce) none, or one, or both of the maximum output power of the UE or maximum UL duty cycle of the UE. Thus, the sending may include one or more of the following: sending, by the user equipment, a random access procedure (RACH) message using a full maximum output power of the user equipment that is greater than the reduced maximum output power and using a full maximum uplink duty cycle for the user equipment that is greater than the reduced maximum uplink duty cycle; sending, by the user equipment, a random access procedure (RACH) message using a full maximum output power of the user equipment that is greater than the reduced maximum output power and using the reduced maximum uplink duty cycle for the user equipment; sending, by the user equipment, a random access procedure (RACH) message using the reduced maximum output power of the user equipment and using a full maximum uplink duty cycle for the user equipment that is greater than the reduced maximum uplink duty cycle; or sending, by the user equipment, a random access procedure (RACH) message using the reduced maximum output power and using the reduced maximum uplink duty cycle for the user equipment.

Also, according to an example embodiment, the UE may determine an uplink duty cycle budget for the UE, e.g., based on the power exposure (e.g., MPE) event. The UL duty cycle budget may be an amount (e.g., amount of time, percentage of resources, amount of data) that may be transmitted by the UE. Thus, the UL duty cycle budget may indicate an amount of uplink transmission time and/or transmission power that may be used by the UE for uplink transmissions while complying with a power exposure restriction or MPE limit. Thus, the method may include performing at least one of the following: wherein the sending comprises sending, by the user equipment, a random access procedure (RACH) message using a full maximum output power of the user equipment that is greater than the reduced maximum output power and using a full maximum uplink duty cycle for the user equipment that is greater than the reduced maximum uplink duty cycle, while omitting or skipping, by the user equipment, a scheduled uplink transmission of data in order to comply with the uplink duty cycle budget and the power exposure restriction; or wherein the sending comprises sending, by the user equipment, a random access procedure (RACH) message using at least one of a the reduced maximum output power of the user equipment or the reduced maximum uplink duty cycle, while also sending, by the user equipment, a scheduled uplink transmission of data, in order to comply with the uplink duty cycle budget and the power exposure restriction.

The UE may continue to monitor conditions for a power exposure (e.g., MPE) event, such as, for example, the UE-user distance, transmission power and/or transmit beam direction with respect to a location of a user, or other criteria. For example, as the distance between the UE and the user changes, the UE may adjust (again) one or both of the maximum output power of the UE and/or the maximum UL duty cycle of the UE, and may send another message to the BS providing updated power exposure event information. For example, if the user moves slightly further away from the UE (e.g., greater than a first threshold, but less than a second threshold that still indicates a power exposure event), then the UE may slightly increase the maximum output power of the UE and/or slightly increase the maximum UL duty cycle of the UE. This updated power exposure event information may then be sent to the BS via another message. The BS may then adjust the allocated antenna elements and/or the receive beamforming gain again (or take other action), based on the updated power exposure event information received from the UE. Also, the BS may allocate or assign UL resources to the UE to accommodate the adjusted (e.g., reduced) maximum UL duty cycle, e.g., so as not to exceed the indicated reduced (or adjusted) maximum UL duty cycle for the UE that is indicated by the UE and/or determined by the BS.

The UE may continue monitoring for a power exposure event, e.g., based on signals received from a UE proximity sensor, or using other technique. For example, at some point, the user may take his hand off of the UE antenna (or move away from the UE), such that the distance between the UE and the user is now greater than the threshold, meaning that the power exposure event for the UE has ended. In response to detecting that the power exposure (e.g., MPE) event has ended, the UE may send another message to the BS indicating the end of the power exposure event for the UE. The BS may then, e.g., take actions with respect to the UE to place the BS in a state that it was before the BS received an indication of the UE power exposure event, e.g., such as the BS performing one or more of: the BS reducing the number of allocated antenna elements of the BS for receiving signals from the UE (e.g., back to the original or initial number of allocated receive antenna elements that were used prior to the UE power exposure event), the BS decreasing the maximum UL duty cycle for the UE back to an initial maximum UL duty cycle (and/or allocating of resources to the UE for UL transmission based on this initial maximum UL duty cycle), the BS decreasing the receive beamforming gain of the BS used to receive signals from the UE back to its initial receive beamforming gain used by the BS before receiving the indication of the UE power exposure event, etc.

Therefore, according to an example embodiment, a method may include, (i) a signalling procedure that allows a UE to notify the serving BS whenever a power exposure (e.g., MPE) event occurs at the UE; and (ii) a mechanism that allows the serving BS to cope with a likely decrease in UL transmission power from the UE (to allow the BS to perform one or more actions that may at least partially compensate for a reduced maximum UE output power and/or a reduced maximum UL duty cycle of the UE). According to an example embodiment, an UL duty cycle of the UE may include a percentage (or portion) of time, such as a percentage of slots, that are available to a UE for UL transmission (e.g., a percentage of slots for which at least some UL resources have been allocated to the UE for UL transmission to the BS). With respect to i), as noted, the UE may notify the BS of the occurrence of the power exposure event and provide details (e.g., a MPE state for the UE) to the BS by sending a RACH message (e.g., msgA/message A of the 2-step RACH procedure, or other RACH message), for example. The UE may, for example, reduce (or decrease) its maximum output power (e.g., by performing a peak/maximum power backoff) and/or decrease its UL duty cycle, and may notify the BS of the reduced maximum output power value and/or a reduced maximum UL duty cycle for the UE. With respect to ii), the BS may, for example, offset a UE reduction (decrease) in maximum output power and/or a reduction (decrease) in a maximum UL duty cycle for the UE by allocating additional antenna elements at the BS and/or by increasing a receive beamforming gain at the BS receiver for receiving signals from the UE. For example, the process performed by the BS of increasing the number of allocated receive antenna elements and/or increasing a receive beamforming gain at the BS may be referred to as link budget rebalancing, e.g., since these actions at the BS are performed to increase signal strength at the BS in attempt to compensate for the decrease in signal strength of the signal transmitted by the UE. As an illustrative example, a UE maximum output power reduction performed at the UE may decrease transmitted signal power by, e.g., 20 dB (or more), while the BS may increase signal power of a received signal at the BS by maybe 15-20 dB based on increasing receive beamforming gain, for example.

According to an example embodiment, a UE may already be connected to a BS, and there is a transmission ongoing from UE to BS, for example. In this example, the user may inadvertently place his hand on the UE antenna, causing a detected power exposure (e.g., MPE) event. The UE may than take steps to reduce the power exposure to the UE, in response to the detected power exposure event, e.g., such as reducing a maximum output power and/or reducing a maximum UL duty cycle (e.g., from 50% UL duty cycle to 20% UL duty cycle). However, without notifying the BS of the power exposure event (and/or without providing some of the MPE event details or MPE state to the BS), a radio link failure may occur for the radio link or connection between the UE and the BS. Thus, to notify the BS of the power exposure event for the UE and/or to inform the BS of some actions taken by the UE to decrease power exposure (in response to a power exposure event at the UE), the UE may send a message to the BS (e.g., via a RACH message) including a UE ID, indicating a power exposure (e.g., MPE) event has occurred for the UE and is the cause/trigger for this message, and information identifying a reduced maximum output power (or maximum power backoff) and/or a reduced maximum UL duty cycle for the UE. This message (and/or its details) may allow the BS to then become aware of the actions taken by the UE in response to the power exposure event, and the BS may then perform actions to maintain the radio link between the UE and BS, such as by allocating additional receive antenna elements at the BS and/or by increasing a receive beamforming gain at the BS for receiving signals from the UE.

Figure 6:
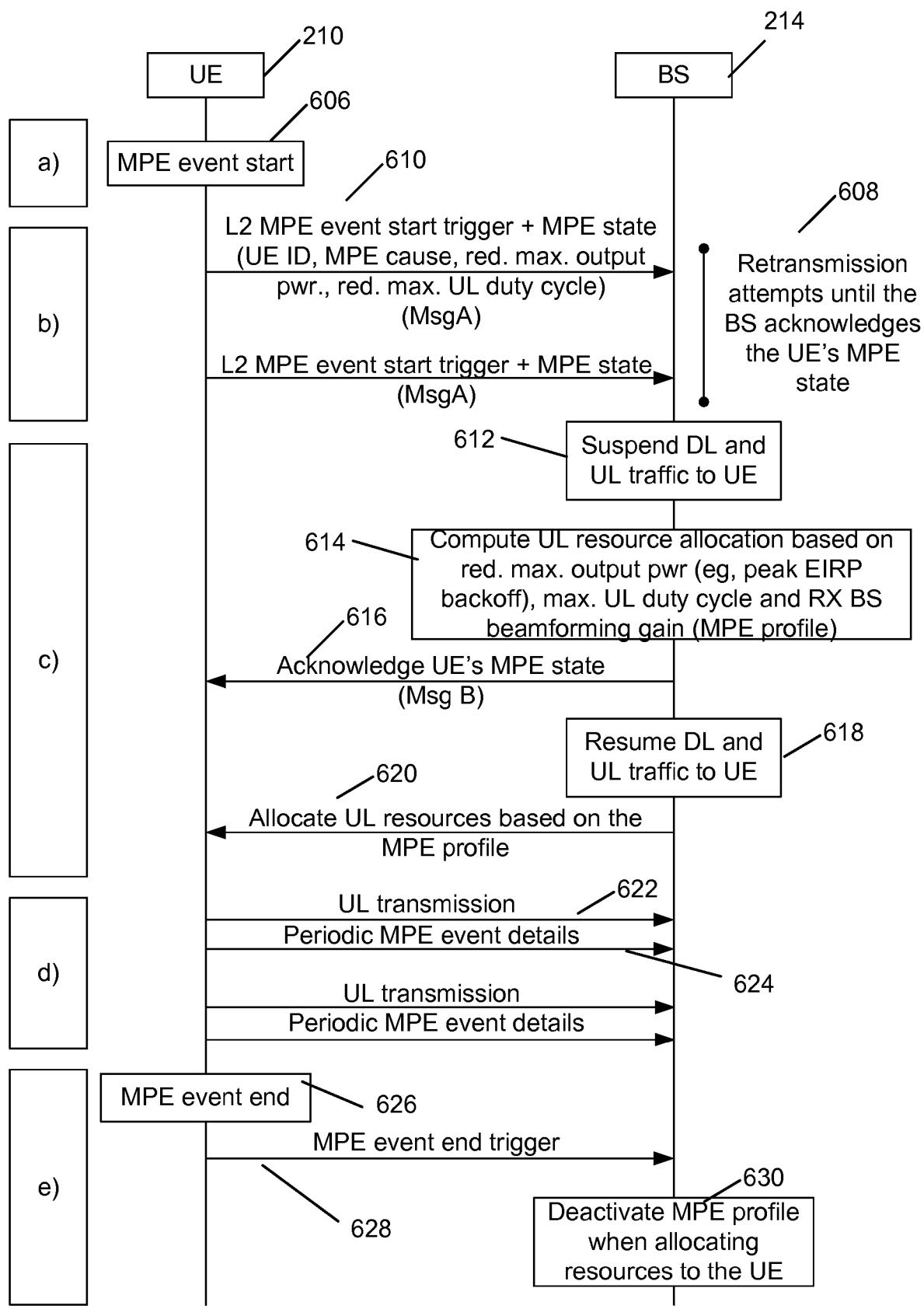
FIG. 6 is a diagram illustrating a power exposure event detection, reporting and a base station response according to an example embodiment.

FIG. 6 is a diagram illustrating a power exposure event detection, reporting and a base station response according to an example embodiment. To summarize FIG. 6, this process may include: a) The UE detects the need to backoff (or reduce) its transmission power (e.g., reduction of the allowed peak EIRP, or reduction of maximum output power) due to a power exposure (e.g., MPE) event, e.g., such as by UE detecting, via proximity sensor, that $d_{min} > d_{user-UE}$); b) The UE informs the BS (e.g., via a MPE aware 2-step RACH procedure message) about the required maximum UL transmit power backoff/reduction by the UE; c) The BS compensates for the power exposure (e.g., MPE) event induced reduction in the maximum output power by the UE (e.g., maximum power backoff/maximum EIRP backoff) by rebalancing the UL link budget. According to an example embodiment, the BS may perform UL link budget rebalancing, e.g., through a combination of the UE UL duty cycle reduction and/or the increase of the receive (RX) beamforming gain at the BS; d) The UE reports periodically about the state of the MPE event; UE periodically provides updated info on MPE event, e.g., updated MPE state, e.g., as user slides or moves finger on or off the antenna, so the UE will then adjust (e.g. based on updated parameters of the detected power exposure event) its maximum output power and/or adjust its maximum UL duty cycle because less of user's finger over less of antenna (or the distance between user and UE is now different); UE provides the updated MPE event information/MPE state (or details) to the BS, and the BS dynamically adjusts radio link (UE UL duty cycle, and/or its receive beamforming gain at the BS) to try to accommodate the MPE state of the UE due to MPE event, e.g., in attempt to maintain the radio link between the UE and BS. For example, an UL duty cycle below 20% may, at least in some cases, typically cause RLF, and/or a 20 dB drop is signal strength at the BS will typically cause a radio link failure (RLF), as examples. However, these UE adjustments (e.g., reducing maximum output power and/or reducing a maximum UL duty cycle at the UE, which may typically cause the UE output power and/or UE UL duty cycle to be reduced at the UE) performed by UE in response to the detected MPE event can, at least in some cases, be at least partially compensated for at the BS, e.g., if the UE notifies the BS of the MPE event, and/or provides some MPE details or MPE state of the UE relating to the power exposure (e.g., MPE) event and/or relating to actions performed by UE in response to the UE power exposure (e.g., MPE) event. Also, at e), the UE detects an end of the power exposure (e.g., MPE) event, such as by detecting that the $d_{min} < d_{user-UE}$), the UE informs the BS to rebalance the UL link budget to the pre-MPE event conditions (e.g., the BS may then decrease the number of allocated antenna elements, decrease the receive beamforming gain, and/or may decrease the UL duty cycle of the UE).

Thus, an example embodiment may include: 1) (MPE event start trigger+MPE event details) Reporting to BS that a power backoff is applied in the UE, due to MPE event detection, such as due to human body detection close to the antenna used for uplink at the UE as well as the actual power backoff (EIRP reduction in dB) required; (MPE event end trigger) The UE reports the end of the MPE event and/or any further adjustment in UE output power (or UE maximum output power), such as reporting returning the UE maximum output power to its previous output value, which may then allow the BS to resume the antenna pattern at the BS and/or decrease the receive beamforming gain to its pre-MPE even value.

With respect to the UE, the method or process may include: (Use of a MPE-event aware RACH message, such as a message A of a 2-step RACH procedure to send a message to the BS). The UE output power restrictions (e.g., EIRP restrictions) due to MPE event may be respected by the 2-step RACH retransmission procedure, by the UE spreading each 2-step RACH message A retransmission attempt over time according with the required EIRP backoff (which is equivalent to duty cycle reduction). Furthermore, each 2-step RACH message A transmission may be performed by UE with maximum power, in contrast with the power ramping procedure associated with the 2-step RACH.

With respect to the BS/gNB: The BS may receive the message, e.g., receive the RACH message indicating the UE MPE event, and indicating one or more details related to the MPE event, such as actions taken by the UE in response to the MPE event. BS may perform radio resource management that leverages the reduction of UE's output power and/or reduction of UE's UL duty cycle with an increase of the receive beamforming gain at the BS, e.g., by reconfigure the Bs' antenna pattern when receiving the UE's UL transmission.

The example operations of FIG. 6 will now be briefly described. A UE 210 may be in communication with or connected to a BS 214.

At 606, the UE detects the occurrence of the power exposure (e.g., MPE) event, e.g., the UE detects that the distance between the antenna used for uplink at the UE and the user is below a threshold (e.g., less than $d_{min}$ distance). The detection of this power exposure event may be achieved by a proximity sensor or a user presence sensor (which triggers or signals the UE when the user is at a distance from the UE that is below the $d_{min}$ distance) or via a mmWave radar that is able to detect the distance at which the user is from the antenna used for uplink at the UE. These are merely some examples of how a UE may detect a power exposure event, and other techniques may be used to detect a power exposure event.

At 608, the UE performs one or more message transmissions/retransmissions to the BS 214 until the BS acknowledges receipt of the message. At 610, the UE sends/transmits a message (e.g., RACH message A of the 2-step RACH or other message), including a payload sent within physical uplink shared data channel (PUSCH), via a layer 2 (L2) MAC control element (MAC CE), including, e.g., the UE identity (UE ID), a cause or trigger (of the sending of this message) indicated as MPE event, and at least one of a reduced maximum output power of the UE (or power backoff value), and/or a reduced maximum UE UL duty cycle. The transmission of this message may be repeated, e.g., repeated one or more times, until an acknowledgement is received from the BS. The transmission of such repeated messages (with the L2 payload) may be at maximum power (not necessarily restricted by the reduced maximum output power that the UE is using going forward in response to the MPE event) spaced apart in time so as not to violate the maximum UL duty cycle of the UE, for example. Also, if the power exposure for the MPE event is measured over a longer period of time, such as 10 ms, then this may allow the UE to transmit the message at maximum power, and multiple times in a row, and then avoid performing an UL transmission for a period of time so that the power exposure or PD will be below the restriction or maximum level for a MPE, for example.

Thus, at 610, the UE performs the transmission of the MsgA PRACH (RACH preamble, e.g., via a RACH message, such as via a msgA of 2-step RACH procedure) and PUSCH (payload) parts of the message over the resources reserved by the network for the 2-step RACH (note that the UE acquires this information when listening to the SSBs, as part of the initial access). For example, the UE may start a timer to wait for the acknowledgement of the UE's MPE state message from the BS, which may arrive in a feedback message from the BS (e.g., arriving in a MsgB of the 2-step RACH procedure). If the BS is able to decode the MsgA PUSCH payload and the associated L2 MPE event details, then at 612, the BS may temporarily suspend (e.g., stop or cease) the DL and UL traffic sent to and from the UE (including the open HARQ processes).

Then, at 614, the BS recomputes the UL resource allocation based on the reported reduced maximum output power (e.g., peak EIRP backoff), the received or calculated reduced maximum UE UL duty cycle, and the available receive beamforming gain at the BS. This may be denoted or referred to as the derived 'MPE profile'. EIRP may refer to Equivalent Isotropically Radiated Power (EIRP), and is the product of transmitter power and the antenna gain in a given direction relative to an isotropic antenna of a radio transmitter. Normally the EIRP is given in dBi, or decibels over isotropic. Based upon the results in FIG. 3, as an illustrative example, the reduction of the UE EIRP (or UE output power) can be up to 26 dB for a 2×2 antenna array, but may be higher for larger antenna arrays.

For example, based on receipt of message 610 from the UE 210, the BS 214 may determine a MPE profile (in response to the message and MPE state received from the UE 210 at 610), which may include, e.g., UE ID that reported the MPE event, MPE is the cause of the message, a reduced maximum output power of the UE (e.g., which may be indicated in the message at 610), and a reduced maximum UE UL duty cycle (e.g., which may be indicated in the message at 610, or may be determined by the BS 214), an updated number of antenna elements for receiving a signal from the UE 210, and/or an increased receive beamforming gain for the BS 214 to use to receive signals from the UE 210, based on the detected MPE event.

At 616, the BS 214 sends a MPE state acknowledgement, e.g., via the MsgB (via the second message, msgB, of a 2-step RACH procedure, as an example). At 618, the BS 214 resumes the DL and UL traffic from and to the UE 210. At 618, the UL traffic may be implicitly resumed by the allocation of UL resources (at 620) to the UE according to the derived MPE profile (e.g., based on the received or determined maximum UL duty cycle that is part of the MPE profile that has been determined by the BS in response to the received message at 610). As noted, the MPE profile may be determined by the BS based on the message at 610 (including the various details of the MPE event, such as an indication of a reduced maximum UE output power and/or maximum UL duty cycle for the UE). The number of scheduled resources may base based on (or may take into account) one or more of the following: (i) the required EIRP backoff (or the reduced maximum output power, reported by the UE); (ii) the number of BS antenna elements available to increase the receive beam gain; and (iii) the duty cycle reduction (or reduced maximum UL duty cycle for the UE) required to meet the EIRP backoff (UE output power reduction) when the additional beamforming gain as already been taken into account. At 622, the UE 210 may perform an UL transmission to the BS 214 via allocated UL resources.

In the scheduled UL resources (see UL resources allocated to UE 210 via message at 620) there are also included additional resources for the UE to transmit to BS 214 periodic updates (e.g., see 624) of the state of the MPE event. Fore example, MPE event details at 624 may include any MPE or power exposure event details, parameters or information, such as, for example, an updated (reduced) maximum output power and/or an updated reduced maximum UL duty cycle for the UE. The UE may detect a change in the power exposure event (e.g., user is now further away from UE, thus allowing a greater or higher maximum output power or greater maximum UL duty cycle, and these updates may be sent to the BS).

Figure 7:
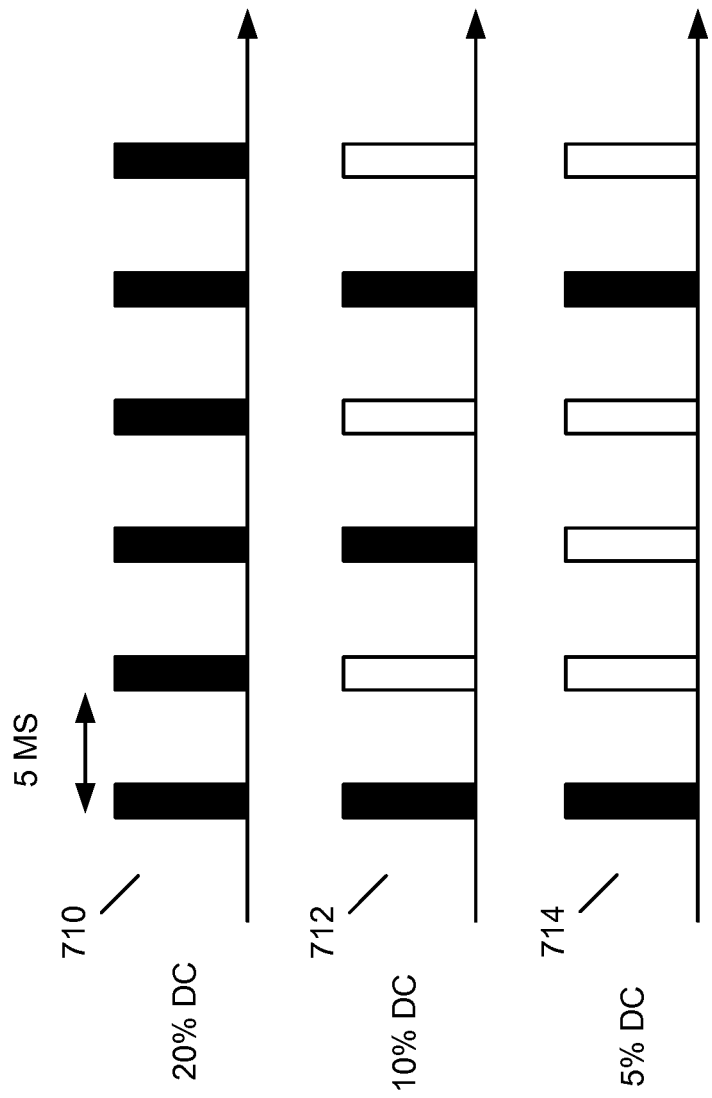
FIG. 7 is a diagram illustrating some example uplink duty cycles according to an example embodiment.

At 608, if the BS 214 is unable to decode the MsgA PUSCH payload, then the timer for the MsgB reply will elapse at the UE 210. The UE 210 will then backoff (wait for a backoff period of time) and re-attempt the MsgA (PRACH preamble and PUSCH payload) transmission at a later 2-step random access opportunity. This backoff (wait for a backoff period of time) will be so that the UE UL transmission meets the UL duty cycle limitations imposed by the MPE event (e.g., if the allowed or maximum UE UL duty cycle is 5% and the 2-step random access opportunities (PRACH/random access preamble and PUSCH payload) occur every 5 ms and last each 1 ms, then the next re-attempt would occur after 20 ms or once every 4 random access opportunities);

FIG. 7 is a diagram illustrating some example uplink duty cycles according to an example embodiment. Control of the 2-step RACH duty cycle by selection of which random access opportunities can be used. In the example shown in FIG. 7, the random access opportunities (MsgA PRACH+ PUSCH) lasts 1 ms, while the periodicity between opportunities is 5 ms. Thus, at 710, a 20% UL duty cycle is shown, with RACH UL transmissions (e.g., transmitting MsgA PRACH preamble+PUSCH payload) lasts 1 ms, and is provided or occurs every 5 ms. At 712, a 10% UL duty cycle provides a 1 ms UL transmission opportunity every 10 ms. And, at 714, a 5% UL duty cycle provides a 1 ms UL transmission every 20 ms. These are merely some illustrative example UL duty cycles, and other values of UL duty cycles may be used.

Referring again to FIG. 6, after the UE receives the acknowledgement of its MPE state (e.g., by receiving a MsgB of the 2-step RACH procedure), the UE 210 may wait for the new UL resource allocation (at 620) so that it can resume its UL transmissions (at 622). This resource allocation includes implicitly the duty cycle that the UE will use in its UL transmissions. The UE then proceeds with its UL transmissions (at 622) and periodically the UE 210 updates the (or transmits an updated) (at 624) L2 MPE event details (this periodicity is controlled by the BS). This report includes the current EIRP backoff information (UE reduced maximum output power value), which may be derived based on the distance between the UE and the user, according to an illustrative example.

At 626, the UE may detect an end of the power exposure (e.g., MPE) event, e.g., proximity sensor on UE detects that distance between UE and user is greater than the threshold). When the MPE event finally ends (e.g., the UE (or UE antenna used for uplink transmission) is farther away from the user than the $d_{min}$ distance), then at 628 the UE informs the BS either via the scheduled L2 messages (where the required EIRP backoff or EIRP backoff/reduction is set to 0 dB) or by triggering a dedicated signalling message (e.g., UE 210 sends a RACH message to BS 214, indicating and end of the MPE event for this UE).

At 630, upon receiving the MPE event end trigger, the BS 214 may deactivate the MPE profile to reset one or more parameters to pre-MPE event status, since the MPE event has ended. For example, deactivation of the MPE profile may include the BS releasing the additional used antenna elements (which were allocated in response to the MPE event) and when scheduling the future UL resources no longer takes the EIRP reduction into account (e.g., there is no UL duty cycle reduction for the UE nor additional beamforming gain at the BS).

According to an example embodiment, one or more or even all of the following information may be made to be part of the RACH message payload or the MsgA payload (e.g., the MsgA PUSCH, via a L2 message) and may include the following: A UE Id—Identification of the UE, e.g. the UE's C-RNTI while in RRC Connected state; MPE event initiation trigger—a Flag identifying that an MPE event is occurring; power/EIRP backoff information—Required backoff in dBs. From FIG. 3, it can be seen that the maximum required power backoff is 26 dBs for a 2×2 antenna array, therefore the message would require a field of 5 bits to represent all integer backoff values, according to this illustrative example. Further information might be included in this message (e.g., MsgA), e.g., such as the buffer status report of the UE (e.g., indicating how much data may be stored in data buffers for UL transmission), so that the BS can use this information when deciding the UE's future UL resource allocation. According to an example embodiment, the actual report to be included in the MsgA payload can be constructed at L2 level (with a new MAC CE).

Figure 8:
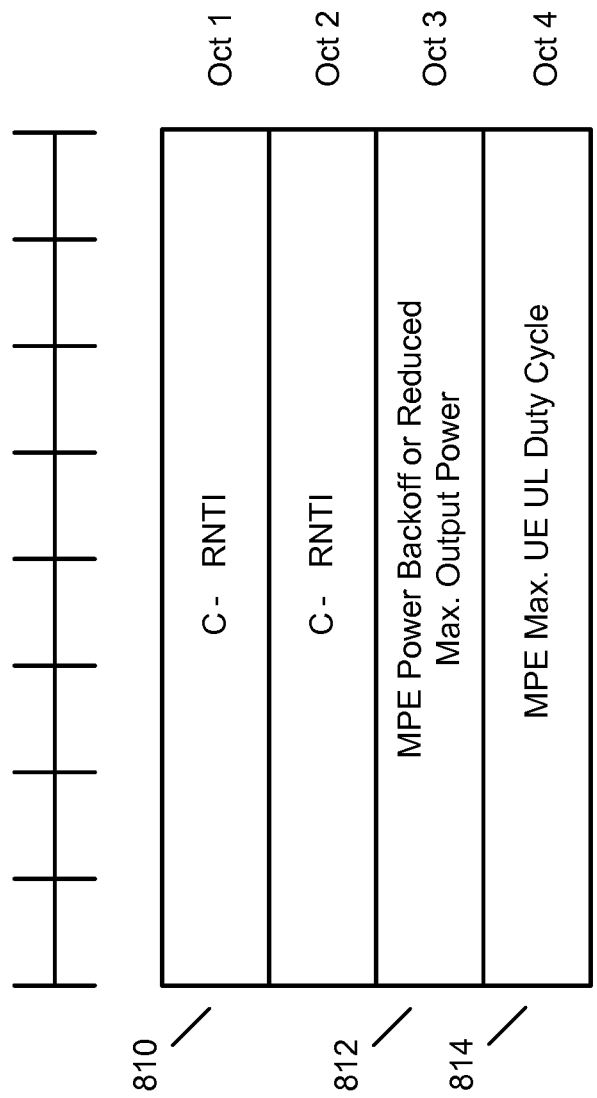
FIG. 8 is a diagram illustrating power exposure (e.g., MPE) event message payload (e.g., MsgA payload) according to an example embodiment.

FIG. 8 is a diagram illustrating power exposure (e.g., MPE) event message payload (e.g., MsgA payload) according to an example embodiment. As shown in FIG. 8, the example message may include a UE identifier or UE ID, which may be, for example, a cell-radio network temporary identifier (C-RNTI) 810 for the UE, a MPE reduced maximum output power or MPE power backoff 812 for the UE, and a MPE maximum UL duty cycle 814 for the UE. These are some example fields, and other fields, or different fields, may be provided.

Link rebalancing may also be performed. upon receiving the information on what is the allowed peak EIRP or allowed maximum reduced output power of the UE (e.g., via the MPE Event L2 MAC CE), the BS may use two mechanisms to ensure that the link budget has the same level as prior to the MPE event.

The first mechanism is through the decrease of UE's UL duty cycle, which has the drawback of reducing the UE's achievable throughput (e.g. 5% duty cycle leads to the reduction of the peak throughput by $1/20$) as well as inducing additional latency and preventing services that require higher throughput (e.g. passive or interactive streaming). Furthermore, as shown in FIG. 3, in some cases, such as for short distances between the UE and the user, the reduction of the UE's UL duty cycle by itself is not sufficient to prevent the decrease of the allowed peak EIRP.

The second mechanism is the allocation of additional receiving antenna elements to the MPE affected UE. The strategy to allocate these antenna elements depends on whether 1-dimensional or 2-dimensional antenna element arrays are available at the BS, for example. In the 1-dimensional case, to achieve an additional 3 dB of beamforming gain, it is required to double the number of used antenna elements. While in the 2-dimensional case, the array area as to be duplicated to achieve an additional 3 dBs. In both cases, the additional beamforming gain comes at the cost of reduced beam width, which will make the link more prone to beam misalignment. This can be compensated by increasing the frequency of beam alignment related measurement reporting.

Figure 9:
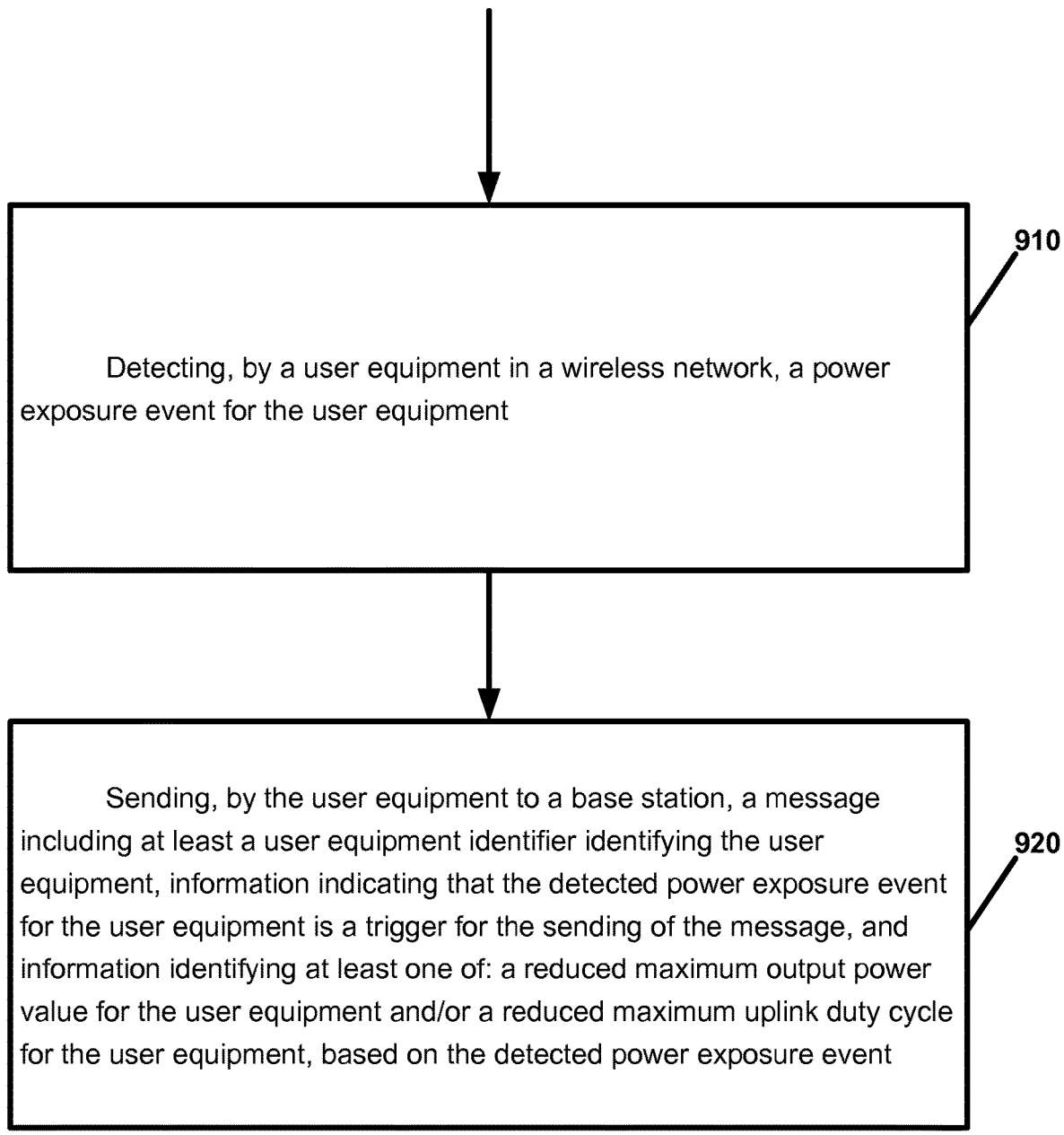
FIG. 9 is a flow chart illustrating operation of a user equipment according to an example embodiment.

Example 1. FIG. 9 is a flow chart illustrating operation of a user equipment (UE) according to an example embodiment. Operation 910 includes detecting, by a user equipment in a wireless network, a power exposure event for the user equipment. Operation 920 includes sending, by the user equipment to a base station, a message including at least a user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

Example 2. The method of example 1, wherein the sending comprises: sending, by the user equipment using a full maximum output power of the user equipment that is greater than the reduced maximum output power, a random access procedure (RACH) message including information indicating that the detected power exposure event for the user equipment is a trigger for the sending of the random access procedure (RACH) message, and information identifying at least one of: a reduced maximum output power value for the user equipment and/or a reduced maximum uplink duty cycle for the user equipment, based on the detected power exposure event.

Example 3. The method of example 2, and further comprising: performing, by the user equipment, one or more retransmissions of the random access procedure (RACH) message using the full maximum output power of the user equipment if an acknowledgement to the random access procedure (RACH) message is not received by the user equipment, wherein the performing the one or more retransmissions of the random access procedure (RACH) message being performed at a time or with a time backoff that is in accordance with the reduced maximum uplink duty cycle for the user equipment.

Example 4. The method of any of examples 1-3 wherein the sending comprises performing at least one of the following: sending, by the user equipment, a random access procedure (RACH) message using a full maximum output power of the user equipment that is greater than the reduced maximum output power and using a full maximum uplink duty cycle for the user equipment that is greater than the reduced maximum uplink duty cycle; sending, by the user equipment, a random access procedure (RACH) message using a full maximum output power of the user equipment that is greater than the reduced maximum output power and using the reduced maximum uplink duty cycle for the user equipment; sending, by the user equipment, a random access procedure (RACH) message using the reduced maximum output power of the user equipment and using a full maximum uplink duty cycle for the user equipment that is greater than the reduced maximum uplink duty cycle; or sending, by the user equipment, a random access procedure (RACH) message using the reduced maximum output power and using the reduced maximum uplink duty cycle for the user equipment.

Example 5. The method of any of examples 1-4 and further comprising determining, by the user equipment, an uplink duty cycle budget indicating an amount of uplink transmission time and/or transmission power that may be used on uplink transmissions while complying with a power exposure restriction; and performing at least one of the following: wherein the sending comprises sending, by the user equipment, a random access procedure (RACH) message using a full maximum output power of the user equipment that is greater than the reduced maximum output power and using a full maximum uplink duty cycle for the user equipment that is greater than the reduced maximum uplink duty cycle, while omitting or skipping, by the user equipment, a scheduled uplink transmission of data in order to comply with the uplink duty cycle budget and the power exposure restriction; or wherein the sending comprises sending, by the user equipment, a random access procedure (RACH) message using at least one of a the reduced maximum output power of the user equipment or the reduced maximum uplink duty cycle, while also sending, by the user equipment, a scheduled uplink transmission of data, in order to comply with the uplink duty cycle budget and the power exposure restriction.

Example 6. The method of any of examples 1-5, further comprising: receiving, by the user equipment from the base station, an acknowledgement that acknowledges receipt by the base station of the message.

Example 7. The method of any of examples 1-6 wherein the reduced maximum output power value comprises at least one of: an absolute value that indicates a maximum output power for the user equipment; or a relative value that indicates an amount that the user equipment will reduce its maximum output power.

Example 8. The method of example 7 wherein the absolute value that indicates a maximum output power for the user equipment comprises at least one of: a maximum effective isotropic radiated power (EIRP) value for the user equipment; or, a maximum output power from an amplifier of the user equipment that is input to an antenna array.

Example 9. The method of any of examples 1-8, wherein the detecting comprises: detecting, based on a proximity sensor of the user equipment, that a distance between the user equipment and an object or user of the user equipment is less than a threshold.

Example 10. The method of any of examples 1-9, further comprising: decreasing, by the user equipment, a maximum output power of the user equipment based on at least one of the power exposure event or the reduced maximum uplink duty cycle for the user equipment.

Example 11. The method of any of examples 1-10, wherein the message comprises a random access procedure (RACH) message.

Example 12. The method of any of examples 1-11, wherein the message comprises a random access (RACH) procedure message including a random access (RACH) preamble and a payload that includes at least the user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

Example 13. The method of example 12, wherein the random access (RACH) procedure message comprises a message of a two-step random access (RACH) procedure.

Example 14. The method of any of claims 1-13, wherein sending the message comprises: sending, by the user device to the base station, a first random access (RACH) procedure message including a random access (RACH) preamble; and sending, by the user device to the base station, a second random access (RACH) procedure message including at least the user equipment identifier identifying the user equipment, and information identifying at least one of: a reduced maximum output power value for the user equipment and/or a reduced maximum uplink duty cycle for the user equipment, based on the detected power exposure event.

Example 15. The method of example 14 wherein at least one of the following is provided: the first random access (RACH) procedure message includes a random access (RACH) preamble associated with or indicating that a power exposure event is a trigger for sending the first random access (RACH) procedure message; or the second random access (RACH) procedure message includes information indicating that the detected power exposure event for the user equipment is a trigger for the sending of at least one of the first random access (RACH) procedure message and/or the second random access (RACH) procedure message.

Example 16. The method of any of examples 14-15, wherein: the first random access (RACH) procedure message comprises a message 1 (msg1) of a four-step random access (RACH) procedure; and the second random access (RACH) procedure message comprises a message 3 (msg3) of the four-step random access (RACH) procedure.

Example 17. The method of any of examples 1-16, wherein the detecting comprises: detecting, based on a proximity sensor of the user equipment, that a distance between the user equipment and an object or user of the user equipment is less than a threshold; the method further comprising determining, by the user equipment based on the distance, the reduced maximum output power value for the user equipment and/or the reduced maximum uplink duty cycle for the user equipment.

Example 18. The method of any of examples 1-17, further comprising: detecting, by a user equipment, an update for the power exposure event for the user equipment; and sending, by the user equipment to the base station, a further message including at least information indicating that a power exposure event for the user equipment is a trigger for the sending of the further message, and information identifying at least one of: a reduced maximum output power value for the user equipment and/or a reduced maximum uplink duty cycle for the user equipment, based on the detected updated power exposure event.

Example 19. The method of example 18, wherein the detecting an update for the power exposure event comprises: detecting, based on a proximity sensor of the user equipment that an updated distance between the user equipment and an object or user of the user equipment is less than a threshold.

Example 20. The method of any of examples 1-19, further comprising:

detecting, by the user equipment, an end of the power exposure event for the user equipment; and sending, by the user equipment to the base station, a message indicating the end of the power exposure event for the user equipment.

Example 21. The method of example 20, wherein the detecting an end of the power exposure event comprises: detecting, based on a proximity sensor of the user equipment, that an updated distance between the user equipment and an object or user of the user equipment is greater than or equal to a threshold.

Example 22. An apparatus comprising means for performing the method of any of examples 1-21.

Example 23. A non-transitory computer-readable storage medium comprising instructions stored thereon that, when executed by at least one processor, are configured to cause a computing system to perform the method of any of claims 1-21.

Example 24. An apparatus comprising: at least one processor; and at least one memory including computer program code; the at least one memory and the computer program code configured to, with the at least one processor, cause the apparatus at least to perform the method of any of claims 1-21.

Example 25. An apparatus comprising: at least one processor; and at least one memory including computer program code; the at least one memory and the computer program code configured to, with the at least one processor, cause the apparatus to: detect, by a user equipment in a wireless network, a power exposure event for the user equipment; and send, by the user equipment to a base station, a message including at least a user equipment identifier identifying the user equipment, information indicating that the detected power exposure event for the user equipment is a trigger for the sending of the message, and information identifying at least one of: a reduced maximum output power value for the user equipment and/or a reduced maximum uplink duty cycle for the user equipment, based on the detected power exposure event.

Figure 10:
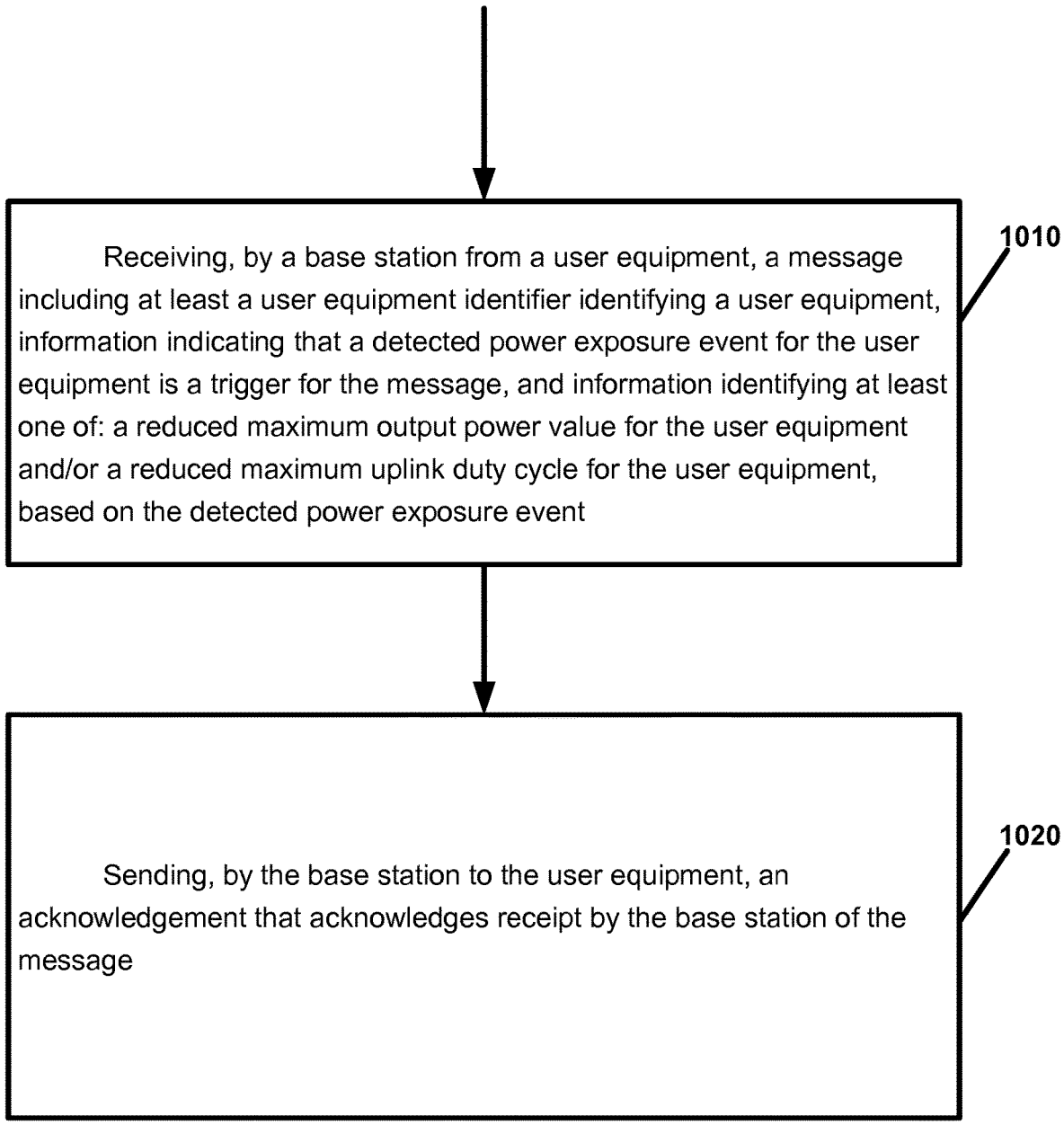
FIG. 10 is a flow chart illustrating operation of a base station according to an example embodiment.

Example 26. FIG. 10 is a flow chart illustrating operation of a base station according to an example embodiment.

Operation 1010 includes receiving, by a base station from a user equipment, a message including at least a user equipment identifier identifying a user equipment, information indicating that a detected power exposure event for the user equipment is a trigger for the message, and information identifying at least one of: a reduced maximum output power value for the user equipment and/or a reduced maximum uplink duty cycle for the user equipment, based on the detected power exposure event. Operation 1020 includes sending, by the base station to the user equipment, an acknowledgement that acknowledges receipt by the base station of the message.

Example 27. The method of example 26, wherein the receiving comprises: receiving, by the base station from the user equipment, a random access procedure (RACH) message that is transmitted by the user equipment using a full maximum output power of the user equipment that is greater than the reduced maximum output power.

Example 28. The method of any of examples 26-27, and further comprising: receiving, by the based station from the user equipment, one or more retransmissions of the random access procedure (RACH) message that are retransmitted by the user equipment using the full maximum output power of the user equipment.

Example 29. The method of any of examples 26-28, further comprising: allocating, by the base station based on the reduced maximum output power value for the user equipment and/or the reduced maximum uplink duty cycle for the user equipment, additional receive antenna elements to be used by the base station for receiving signals from the user equipment.

Example 30. The method of any of examples 26-29, further comprising: increasing, by the base station based on the reduced maximum output power value for the user equipment and/or the reduced maximum uplink duty cycle for the user equipment, a receive beamforming gain of the base station with respect to the user equipment, to be used by the base station to receive signals from the user equipment.

Example 31. The method of any of examples 26-30, further comprising:
allocating, by the base station, resources to the user equipment for uplink transmission based on the reduced maximum uplink duty cycle for the user equipment.

Example 32. The method of any of examples 26-31, wherein the message comprises a random access procedure (RACH) message.

Example 33. The method of any of examples 26-32, wherein the message comprises a random access (RACH) procedure message including a random access (RACH) preamble and a payload that includes at least the user equipment identifier identifying the user equipment, information indicating that the detected power exposure event for the user equipment is a trigger for communication of the message, and information identifying at least one of: a reduced maximum output power value for the user equipment and/or a reduced maximum uplink duty cycle for the user equipment, based on the detected power exposure event.

Example 34. The method of example 33, wherein the random access (RACH) procedure message comprises a message of a two-step random access (RACH) procedure.

Example 35. The method of any of examples 26-34, wherein receiving the message comprises: receiving, by the base station from the user device, a first random access (RACH) procedure message including a random access (RACH) preamble; and receiving, by the base station from the user device, a second random access (RACH) procedure message including at least the user equipment identifier identifying the user equipment, and information identifying at least one of: a reduced maximum output power value for the user equipment and/or a reduced maximum uplink duty cycle for the user equipment, based on the detected power exposure event.

Example 36. The method of example 35 wherein at least one of the following is provided: the first random access (RACH) procedure message includes a random access (RACH) preamble associated with or indicating that a power exposure event is a trigger for receiving the first random access (RACH) procedure message; or the second random access (RACH) procedure message includes information indicating that the detected power exposure event for the user equipment is a trigger for receiving at least one of the first random access (RACH) procedure message and/or the second random access (RACH) procedure message.

Example 37. The method of any of examples 35-36, wherein: the first random access (RACH) procedure message comprises a message 1 (msg1) of a four-step random access (RACH) procedure; and the second random access (RACH) procedure message comprises a message 3 (msg3) of the four-step random access (RACH) procedure.

Example 38. The method of any of examples 26-37, further comprising: receiving, by the base station from the user equipment, a message indicating an end of the detected power exposure event for the user equipment; and decreasing, by the base station based on the end of the detected power exposure event for the user equipment, at least one of: a number of receive antenna elements to be used by the base station for receiving signals from the user equipment and/or a receive beamforming gain to be used by the base station to receive signals from the user equipment.

Example 39. An apparatus comprising means for performing the method of any of examples 26-38.

Example 40. A non-transitory computer-readable storage medium comprising instructions stored thereon that, when executed by at least one processor, are configured to cause a computing system to perform the method of any of examples 26-38.

Example 41. An apparatus comprising: at least one processor; and at least one memory including computer program code; the at least one memory and the computer program code configured to, with the at least one processor, cause the apparatus at least to perform the method of any of examples 26-38.

Figure 11:
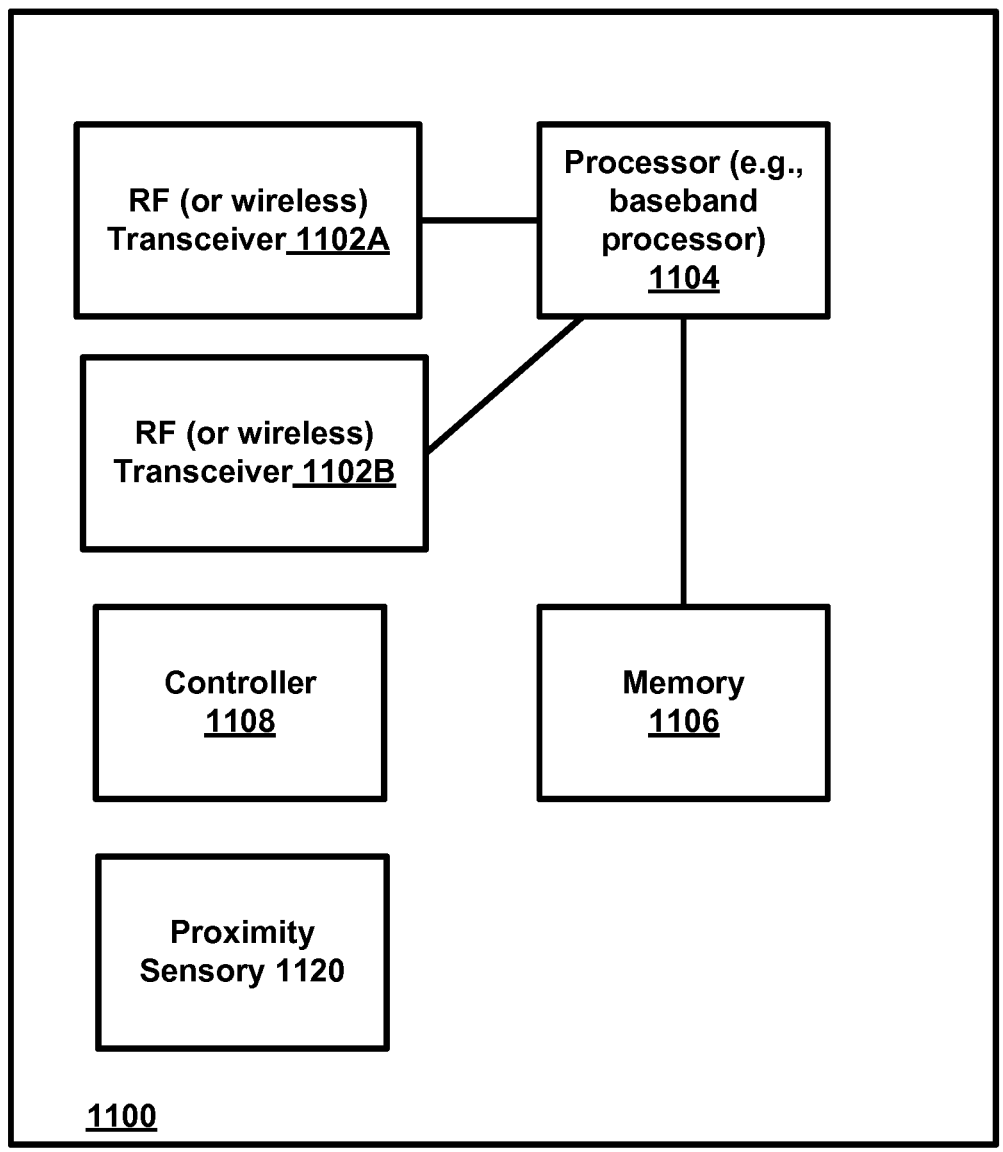
FIG. 11 is a block diagram of a wireless station (e.g., AP, BS, RAN node, UE or user device, or other network node) according to an example embodiment.

FIG. 11 is a block diagram of a wireless station (e.g., AP, BS or user device/UE, or other network node) 1100 according to an example embodiment. The wireless station 1100 may include, for example, one or more (e.g., two as shown in FIG. 11) RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example embodiment, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

Also, wireless station may also include a proximity sensor 1120 to determine a presence of a user near (or in proximity to) the UE, and/or to detect whether a distance between the user and the UE is less than a threshold, for example. Proximity sensor 1120 may be, or may include, for example, a pressure sensor, a thermal sensor, a mmWave radar device, or other device.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   at least one processor; and
   at least one memory including computer program code;
   the at least one memory and the computer program code configured to, with the at least one processor, cause the processor to:
   detect a power exposure event for a user equipment;
   send, to a base station, a message including information indicating that the detected power exposure event for the user equipment is a trigger for the sending of the message, and information identifying: a reduced maximum output power value for the user equipment and a reduced maximum uplink duty cycle for the user equipment, based on the detected power exposure event;
   detect an end of the power exposure event for the user equipment;
   send, to the base station, a message indicating the end of the power exposure event for the user equipment;
   send, using a full maximum output power of the user equipment that is greater than the reduced maximum output power, a random access procedure (RACH) message including information indicating that the detected power exposure event for the user equipment is a trigger for the sending of the RACH message, and information identifying: a reduced maximum output power value for the user equipment and a reduced maximum uplink duty cycle for the user equipment, based on the detected power exposure event; and
   perform one or more retransmissions of the RACH message using the full maximum output power of the user equipment if an acknowledgement to the RACH message is not received by the user equipment, wherein the performing the one or more retransmissions of the RACH message being performed at a time or with a time backoff that is in accordance with the reduced maximum uplink duty cycle for the user equipment.

2. The apparatus of claim 1, wherein the at least one processor and the computer program code configured to determine, by the user equipment, an uplink duty cycle budget indicating an amount of uplink transmission time and transmission power that may be used on uplink transmissions while complying with a power exposure restriction.

3. The apparatus of claim 1, further wherein the at least one processor and the computer program code are further configured to:
   receive, by the user equipment from the base station, an acknowledgement that acknowledges receipt by the base station of the message; and
   wherein, the reduced maximum output power value comprises at least one of an absolute value that indicates a maximum output power for the user equipment; or
   a relative value that indicates an amount that the user equipment will reduce its maximum output power.

4. The apparatus of claim 1, wherein the at least one processor and the computer program code configured to detect comprises the at least one processor and the computer program code configured to:
   detect, based on a proximity sensor of the user equipment, that a distance between the user equipment and an object or user of the user equipment is less than a threshold; and
   wherein, the at least one processor and the computer program code are further configured to decrease, by the user equipment, a maximum output power of the user equipment based on at least one of the power exposure event or the reduced maximum uplink duty cycle for the user equipment.

5. The apparatus of claim 1, wherein the message comprises RACH procedure message including a RACH preamble and a payload that includes at least an identifier of the user equipment identifying the user equipment, and information indicating that the detected power exposure event for the user equipment is a trigger for the sending of the message.

6. The apparatus of claim 1, wherein the at least one processor and the computer program code configured to send comprises the at least one processor and the computer program code configured to:
    send, by the user equipment to the base station, a first RACH procedure message including a RACH preamble; and
    send, by the user equipment to the base station, a second RACH) procedure message including at least an identifier of the user equipment identifying the user equipment, and information identifying at least one of: a reduced maximum output power value for the user equipment and a reduced maximum uplink duty cycle for the user equipment, based on the detected power exposure event.

7. The apparatus of claim 6, wherein the following is provided:
    the first RACH procedure message includes a RACH preamble associated with or indicating that a power exposure event is a trigger for sending the first RACH procedure message; or
    the second RACH procedure message includes information indicating that the detected power exposure event for the user equipment is a trigger for the sending of at least one of the first RACH procedure message and/or the second RACH procedure message.

8. The apparatus of claim 6, wherein: the first RACH procedure message comprises a message 1 (msg1) of a four-step RACH procedure; and the second RACH procedure message comprises a message 3 (msg3) of the four-step RACH procedure.

9. The apparatus of claim 1, wherein the at least one processor and the computer program code configured to detect comprises the at least one processor and the computer program code configured to:
    detect, based on a proximity sensor of the user equipment, that a distance between the user equipment and an object or user of the user equipment is less than a threshold; and
    determine, by the user equipment based on the distance, the reduced maximum output power value for the user equipment and/or the reduced maximum uplink duty cycle for the user equipment.

10. The apparatus of claim 1, wherein the at least one processor and the computer program code are further configured to:
    detect, by a user equipment, an update for the power exposure event for the user equipment; and
    send, by the user equipment to the base station, a further message including at least information indicating that a power exposure event for the user equipment is a trigger for the sending of the further message, and information identifying: a reduced maximum output power value for the user equipment and a reduced maximum uplink duty cycle for the user equipment, based on the detected updated power exposure event.

11. The apparatus of claim 10, wherein the at least one processor and the computer program code configured to detect an update for the power exposure event comprises the at least one processor and the computer program code configured to:
    detect, based on a proximity sensor of the user equipment that an updated distance between the user equipment and an object or user of the user equipment is less than a threshold.

12. A system comprising:
    a user equipment;
    at least one processor; and
    a memory comprising non-transitory computer-readable media having computer-executable instructions stored thereon, that, when executed by the processor, cause the user equipment to perform the following operations:
        detect a power exposure event for the user equipment;
        send, to a base station, a message including information indicating that the detected power exposure event for the user equipment is a trigger for the sending of the message, and information identifying: a reduced maximum output power value for the user equipment and a reduced maximum uplink duty cycle for the user equipment, based on the detected power exposure event;
        detect an end of the power exposure event for the user equipment;
        send, to the base station, a message indicating the end of the power exposure event for the user equipment;
        send, using a full maximum output power of the user equipment that is greater than the reduced maximum output power, a random access procedure (RACH) message including information indicating that the detected power exposure event for the user equipment is a trigger for the sending of the RACH message, and information identifying: a reduced maximum output power value for the user equipment and a reduced maximum uplink duty cycle for the user equipment, based on the detected power exposure event; and
        perform one or more retransmissions of the RACH message using the full maximum output power of the user equipment if an acknowledgement to the RACH message is not received by the user equipment, wherein the performing the one or more retransmissions of the RACH message being performed at a time or with a time backoff that is in accordance with the reduced maximum uplink duty cycle for the user equipment.

13. The system of claim 12, further comprising the base station, wherein the base station configured to: receive, from the user equipment, RACH message that is transmitted by the user equipment using a full maximum output power of the user equipment that is greater than the reduced maximum output power.

14. The system of claim 13, wherein the base station is further configured to:
    allocate, based on the reduced maximum output power value for the user equipment and the reduced maximum uplink duty cycle for the user equipment, additional receive antenna elements to be used by the base station for receiving signals from the user equipment; and
    increase, by the base station based on the reduced maximum output power value for the user equipment and the reduced maximum uplink duty cycle for the user equipment, a receive beamforming gain of the base station with respect to the user equipment, to be used by the base station to receive signals from the user equipment.

15. The system of claim 13, wherein the base station is further configured to:
    receive, from the user equipment, a message indicating an end of the detected power exposure event for the user equipment; and
    decrease, by the base station based on the end of the detected power exposure event for the user equipment the following: a number of receive antenna elements to be used by the base station for receiving signals from the user equipment and/or a receive beamforming gain to be used by the base station to receive signals from the user equipment.

16. A method comprising:
detecting, by user equipment, a power exposure event for the user equipment;
sending, to a base station, a message including information indicating that the detected power exposure event for the user equipment is a trigger for the sending of the message, and information identifying: a reduced maximum output power value for the user equipment and a reduced maximum uplink duty cycle for the user equipment, based on the detected power exposure event;
detecting, by the user equipment an end of the power exposure event for the user equipment;
sending, to the base station, a message indicating the end of the power exposure event for the user equipment;
sending, by the user equipment, using a full maximum output power of the user equipment that is greater than the reduced maximum output power, a random access procedure (RACH) message including information indicating that the detected power exposure event for the user equipment is a trigger for the sending of the RACH message, and information identifying: a reduced maximum output power value for the user equipment and a reduced maximum uplink duty cycle for the user equipment, based on the detected power exposure event; and
performing, by the user equipment, one or more retransmissions of the RACH message using the full maximum output power of the user equipment if an acknowledgement to the RACH message is not received by the user equipment, wherein the performing the one or more retransmissions of the RACH message being performed at a time or with a time backoff that is in accordance with the reduced maximum uplink duty cycle for the user equipment.

17. The method of claim 16, further comprising determining, by the user equipment, an uplink duty cycle budget indicating an amount of uplink transmission time and transmission power that may be used on uplink transmissions while complying with a power exposure restriction.

18. The method of claim 16, further comprising:
receiving, by the user equipment from the base station, an acknowledgement that acknowledges receipt by the base station of the message; and
wherein, the reduced maximum output power value comprises at least one of an absolute value that indicates a maximum output power for the user equipment; or
a relative value that indicates an amount that the user equipment will reduce its maximum output power.

19. The method of claim 16, further comprising:
detecting, by the user equipment based on a proximity sensor of the user equipment, that a distance between the user equipment and an object or user of the user equipment is less than a threshold; and
decreasing, by the user equipment, a maximum output power of the user equipment based on at least one of the power exposure event or the reduced maximum uplink duty cycle for the user equipment.

20. The method of claim 16, wherein the message comprises RACH procedure message including a RACH preamble and a payload that includes at least an identifier of the user equipment identifying the user equipment, and information indicating that the detected power exposure event for the user equipment is a trigger for the sending of the message.

* * * * *